(12) United States Patent
Chui et al.

(10) Patent No.: US 6,229,926 B1
(45) Date of Patent: May 8, 2001

(54) MEMORY SAVING WAVELET-LIKE IMAGE TRANSFORM SYSTEM AND METHOD FOR DIGITAL CAMERA AND OTHER MEMORY CONSERVATIVE APPLICATIONS

(75) Inventors: Charles K. Chui, Menlo Park; Lefan Zhong, Santa Clara, both of CA (US)

(73) Assignee: PicSurf, Inc., Mountain View, CA (US)

(*) Notice: Subject to any disclaimer, the term of this patent is extended or adjusted under 35 U.S.C. 154(b) by 0 days.

(21) Appl. No.: 09/358,876

(22) Filed: Jul. 22, 1999

Related U.S. Application Data

(60) Provisional application No. 60/094,129, filed on Jul. 24, 1998.

(51) Int. Cl.[7] ............................... G06K 9/36; G06K 9/46
(52) U.S. Cl. ......................... 382/240; 382/248; 382/233; 375/240.19
(58) Field of Search ..................... 382/232, 233, 382/240, 244, 248, 249, 276; 375/240.03, 240.1, 240.11, 240.24, 240.19, 240.18

(56) References Cited

U.S. PATENT DOCUMENTS

| | | | |
|---|---|---|---|
| 5,825,935 | 10/1998 | Murakoshi | 382/248 |
| 5,867,602 | 2/1999 | Zandi et al. | 382/248 |
| 5,870,502 | 2/1999 | Bonneau et al. | 382/249 |
| 5,949,911 | * 9/1999 | Chui et al. | 382/240 |
| 6,069,977 | * 5/2000 | Kim et al. | 382/240 |
| 6,134,350 | * 10/2000 | Beck | 382/240 |
| 6,141,452 | * 10/2000 | Murao et al. | 382/240 |
| 6,141,453 | * 10/2000 | Banham et al. | 382/240 |

FOREIGN PATENT DOCUMENTS

PCT/US99/ 16738 10/1999 (WO).

* cited by examiner

*Primary Examiner*—Bhavesh Mehta
(74) *Attorney, Agent, or Firm*—Pennie & Edmonds LLP

(57) ABSTRACT

A digital camera includes a data capture device and data processing circuitry for processing image data representing captured images. The data processing circuitry processes tiles of the image data in a predefined order to generated processed image data, which is then stored as a data image file. The tiles are nonoverlapping portions of the image data. Each tile of image data is processing by applying a predefined sequence of transform layers to the tile of image data so as to generate successive layers of transform coefficients. In a preferred embodiment, the transform layers are successive applications of a wavelet-like decomposition transform. While each tile is processed, a predefined set of edge transform coefficients from a plurality of the transform layers are saved in memory for use while processing neighboring tiles. Further, the step of processing each tile includes applying at least a plurality of the transform layers to both transform coefficients generated by a prior transform layer and corresponding ones of the edge transform coefficients that were previously saved in memory while processing tiles neighboring the tile being processed. However, for some tiles along the edge of the image, there will be no edge transform coefficients from previously processed tiles to be used while processing the current tile.

49 Claims, 15 Drawing Sheets

MEMORY SAVING WAVELET-LIKE IMAGE TRANSFORM SYSTEM AND METHOD FOR DIGITAL CAMERA AND OTHER MEMORY CONSERVATIVE APPLICATIONS

This application is a continuation of U.S. provisional patent application Ser. No. 60/094,129, filed Jul. 24, 1998.

The present invention relates generally to the processing and storage of images in digital cameras and other devices where large image files must be processed with relatively little memory, and particularly to a system and method for applying a wavelet or wavelet-like transform to a picture using a transform tile size that is much smaller than the picture and using much less working memory than would be required if the transform were applied to the entire picture at once, and without generating undesirable tile border effects.

BACKGROUND OF THE INVENTION

Digital cameras typically include high speed, expensive working memory for processing image data, and non-volatile internal and/or removable storage for storing image files. Many digital cameras use removable flash memory cards for storing image files. The working memory is preferably provided on the same ASIC (application specific integrated circuit) as the image processing circuitry, and thus is very expensive. In order to accommodate large working memories, the working memory would have to be implemented on separate integrated circuits, which is highly undesirable because it substantially slows access to the memory, which would slow down the operation of the camera, would require the use of additional complex interface circuitry in both the working memory and the processor circuits, and would require more battery power.

To give a numeric example, for a digital camera that generates images of 1024×1024 pixels with 24 bits of color image data per pixel, the amount of working memory required to store the entire image would be 3 megabytes (MB). Additional working storage would be required for processing the image. Given the power consumption and cost limitations associated with consumer market digital cameras, 3 MB is simply not a feasible amount of working memory, at least as of 1999.

It is well known in the prior art that digital images can be processed a portion at a time, instead of all at once, thereby reducing memory requirements. For instance, the DCT transform used for JPEG compression and encoding of images is traditionally used on tiles of 8×8 pixels. However, a well known problem with tiling an image for processing is that the tiling produces undesirable tile border effects. The border effects of DCT tiling in JPEG images are considered to be acceptable because the very small size of the tiles makes the tiling effect relatively unnoticeable to the human eye.

However, using very small tiles such as 8×8 pixels is not practical when using wavelet or wavelet-like transforms in place of the DCT transform. Wavelet-like transforms have been shown to provide significantly better data compression than the DCT transform, and therefore using wavelet-like transforms in digital cameras would be desirable if the tiling effect can be avoided while using a moderate amount of working memory.

It is an object of the present invention to provide a digital camera that process images using a moderate amount of working memory, such as 5 or 6 KB, by transforming the image data using a wavelet-like transform with moderately sized tiles, such as tiles of 32×32 or 16×32 pixels, while at the same time avoiding the generation of undesirable tile border effects.

SUMMARY OF THE INVENTION

In summary, the present invention is a digital camera includes working memory, image processing circuitry and non-volatile memory for storing image files. The image processing circuitry applies a predefined transform, such as a wavelet-like transform, to image data received from the image capture mechanism to generated transform image data and applies a data compression method to the transform image data so as to generate an image file.

The image processing circuitry also includes image reconstruction circuitry and one or more state machines for successively applying a data decompression method and an inverse transform to a specified one of the image files so as to generate a reconstructed image suitable for display on an image viewer.

The image processing circuitry tiles a captured image, processing the tiles in a predefined order so that intermediate transform values from each tile, except the last tile, can be used when processing later tiles. The tiles are nonoverlapping portions of the image data. Each tile of image data is processing by applying a predefined sequence of transform layers to the tile of image data so as to generate successive layers of transform coefficients. In a preferred embodiment, the transform layers are successive applications of a wavelet-like decomposition transform. While each tile is processed, a predefined set of edge transform coefficients from a plurality of the transform layers are saved in memory for use while processing neighboring tiles. Further, the step of processing each tile includes applying at least a plurality of the transform layers to both transform coefficients generated by a prior transform layer and corresponding ones of the edge transform coefficients that were previously saved in memory while processing tiles neighboring the tile being processed. However, for some tiles along the edge of the image, there will be no edge transform coefficients from previously processed tiles to be used while processing the current tile.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Digital Camera Architecture

Figure 1:
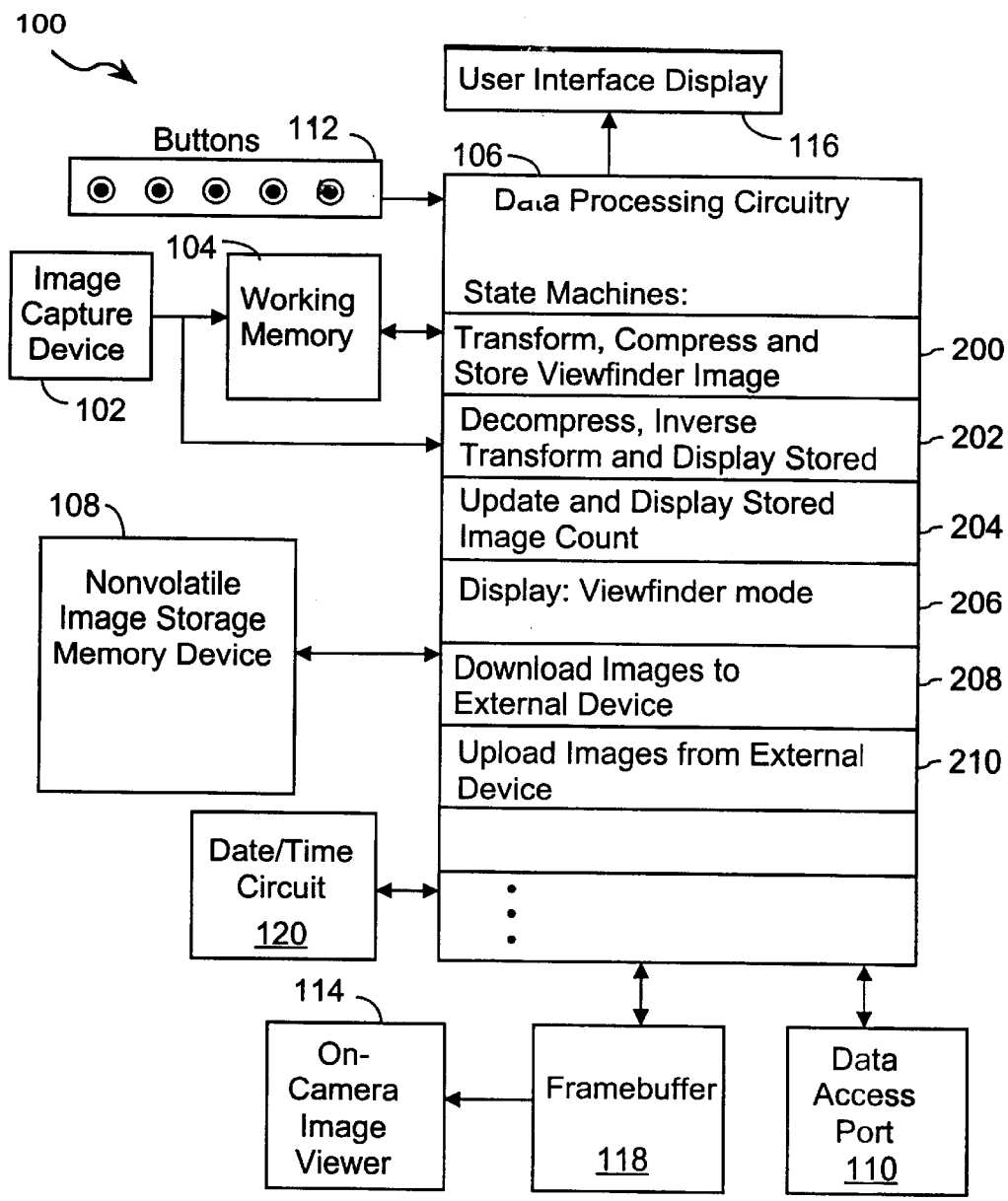
FIG. 1 is a block diagram of a digital camera in accordance with an embodiment of the present invention.

Referring to FIG. 1, there is shown an embodiment of a digital camera system 100 in accordance with the present invention. The digital camera system 100 includes an image capture device 102, such as a CCD sensor array or any other mechanism suitable for capturing an image as an array of digitally encoded information. Thus the image capture device is assumed to include analog to digital conversion (ADC) circuitry for converting analog image information into digital values.

A working memory 104, typically random access memory, receives digitally encoded image information from the image capture device 102. More generally, it is used to store a digitally encoded image while the image is being transformed and compressed and otherwise processed by the camera's data (i.e., image) processing circuitry 106. The data processing circuitry 106 in one embodiment consists of hardwired logic and a set of state machines for performed a set of predefined image processing operations.

In alternate embodiments the data processing circuitry 106 could be implemented in part or entirely using a fast general purpose microprocessor and a set of software procedures. However, at least using the technology available in 1998, it would be difficult to process and store full resolution images (e.g., full color images having 1280×840 pixels) fast enough to enable the camera to be able to take, say, 20 pictures per second, which is a requirement for some commercial products. If, through the use of parallel processing techniques or well designed software a low voltage, general purpose image data microprocessor could support the fast image processing needed by digital cameras, then the data processing circuit 106 could be implemented using such a general purpose microprocessor.

Each image, after it has been processed by the data processing circuitry 106, is typically stored as an "image file" in a nonvolatile memory storage device 108, typically implemented using "flash" (i.e., EEPROM) memory technology. The nonvolatile memory storage device 108 is preferably implemented as a removable memory card. This allows the camera's user to remove one memory card, plug in another, and then take additional pictures. However, in some implementations, the nonvolatile memory storage device 108 may not be removable, in which case the camera will typically have a data access port 110 to enable the camera to transfer image files to and from other devices, such as general purpose, desktop computers. Digital cameras with removable nonvolatile memory 108 may also include a data access port 110.

The digital camera 100 includes a set of buttons 112 for giving commands to the camera. In addition to the image capture button, there will typically be several other buttons to enable the use to select the quality level of the next picture to be taken, to scroll through the images in memory for viewing on the camera's image viewer 114, to delete images from the nonvolatile image memory 108, and to invoke all the camera's other functions. Such other functions might include enabling the use of a flash light source, and transferring image files to and from a computer. The buttons in one embodiment are electromechanical contact switches, but in other embodiments at least some of the buttons may be implemented as touch screen buttons on a user interface display 116, or on the image viewer 114.

The user interface display 116 is typically implemented either (A) as an LCD display device separate from the image viewer 114, or (B) as images displayed on the image viewer 114. Menus, user prompts, and information about the images stored in the nonvolatile image memory 108 may be displayed on the user interface display 116, regardless of how that display is implemented.

After an image has been captured, processed and stored in nonvolatile image memory 108, the associated image file may be retrieved from the memory 108 for viewing on the image viewer. More specifically, the image file is converted from its transformed, compressed form back into a data array suitable for storage in a framebuffer 118. The image data in the framebuffer is displayed on the image viewer 114. A date/time circuit 120 is used to keep track of the current date and time, and each stored image is date stamped with the date and time that the image was taken.

Overview of Image Capture and Processing

Figure 2:
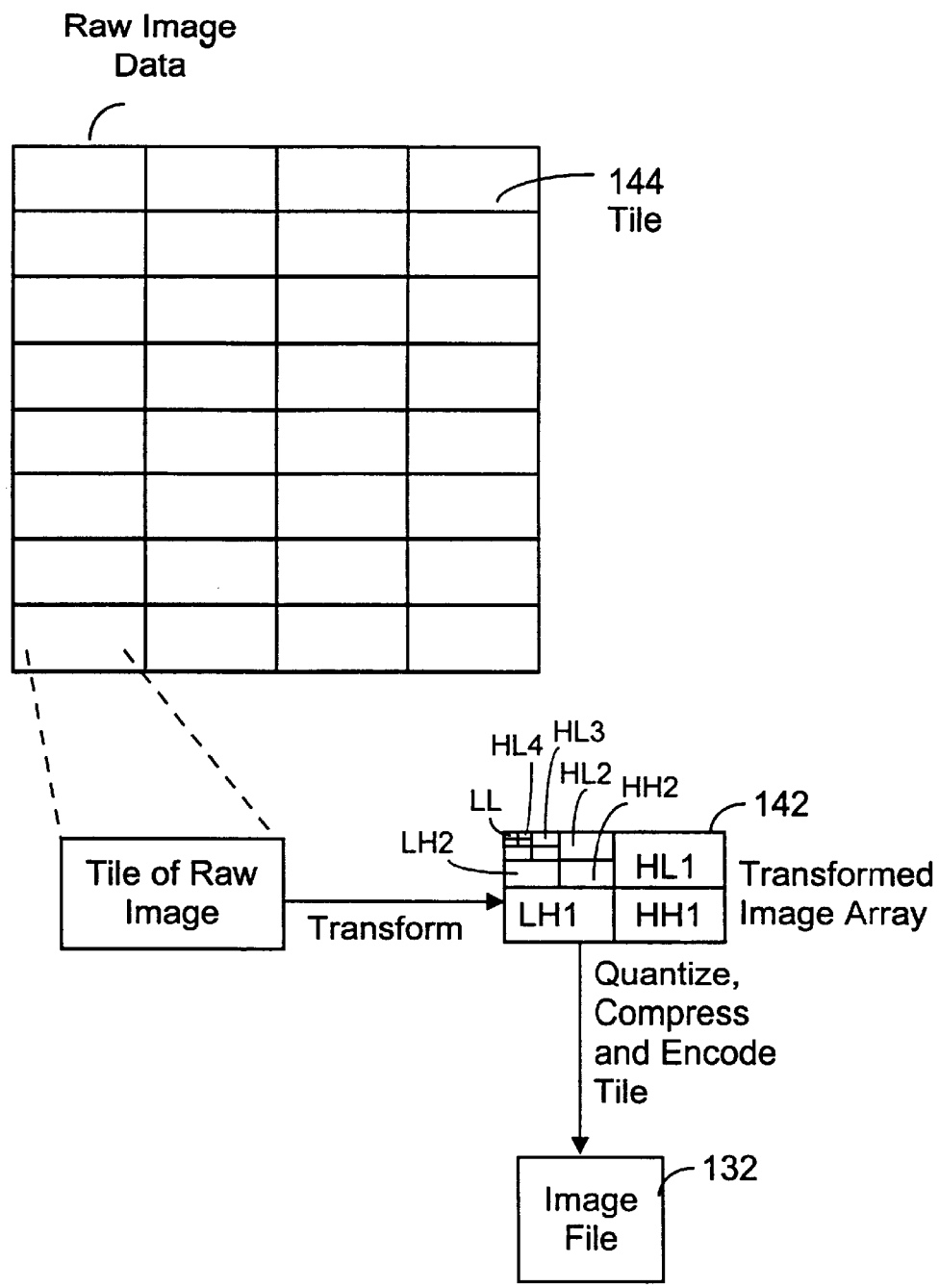
FIG. 2 schematically depicts the process of transforming a raw image into a transform image array and compressing the transform image array into a compressed image file.

Referring to FIG. 2, raw image data 140, obtained from the digital camera's image capture mechanism 102 (FIG. 1), is processed by "tiling the image data." More specifically, the raw image is treated as an array of tiles 144, each tile having a predefined size such as 32×32 (i.e., 32 rows by 32 columns). The tiles are nonoverlapping portions of the image data. A sufficient number of tiles are used to cover the entire raw image that is to be processed, even if some of the tiles overhang the edges of the raw image. The overhanging portions of the tiles are filled with copies of boundary data values during the wavelet transform process. Tile positions are specified with respect to an origin at the upper left corner of the image, with the first coordinate indicating the Y position of the tile (or a pixel or coefficient within the tile) and the second coordinate indicating the X position of the tile (or a pixel or coefficient within the tile). Thus a tile at position 0,64 is located at the top of the image, and has its origin at the $64^{th}$ pixel of the top row of pixels.

A wavelet or wavelet-like transform is successively applied to each tile of the image to convert the raw image data in the tile into a set of transform coefficients 142. The tiles are processed in a predetermined raster scan order. In other words, the tiles in a top row are processed going from one end (e.g., the left end) to the opposite end (e.g., the right end), before processing the next row of tiles immediately below it, and continuing until the bottom row of tiles of the raw image data has been processed.

The transform coefficients for each tile are generated by successive applications of a wavelet-like decomposition transform. A first application of the wavelet decomposition transform to an initial two dimensional array of raw image data generates four sets of coefficients, labeled LL, HL1, LH1 and HH1. Each succeeding application of the wavelet decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet decomposition transform iteration only one LL set remains. The total number of coefficients generated is equal to the number of data samples in the original data array. The different sets of coefficients generated by each transform iteration are sometimes called layers. The number of wavelet transform layers generated for an image is typically a function of the resolution of the initial image. For tiles of size 32×32, performing four wavelet transformation layers is typical. The wavelet coefficients produced by application of the wavelet-like transform are preferably quantized by dividing all the coefficients in the transformed tile by a quantization value.

Details of the wavelet-like transform used in a preferred embodiment are described in detail below. Circuitry for performing the wavelet-like transform of the preferred embodiment is very similar to the wavelet transform and data quantization methods described in U.S. Pat. No. 5,909,518, "System and Method for Performing Wavelet and Inverse Wavelet Like Transformations of Digital Data Using Only Add and Bit Shift Arithmetic Operations," which is hereby incorporated by reference as background information.

After each tile of the raw image has been transformed into wavelet coefficients, the resulting array of wavelet coefficients are compressed and encoded. Each tile of wavelet coefficients 144 is compressed and encoded using a sparse data encoding technique. In one embodiment, the method of compressing and encoding the tile is the method described in detail in U.S. patent application Ser. No. 08/858,035, filed May 16, 1997, entitled "System and Method for Scalable Coding of Sparse Data Sets," now U.S. Pat. No. 5,949,911, which is hereby incorporated by reference as background information.

Figure 3A:
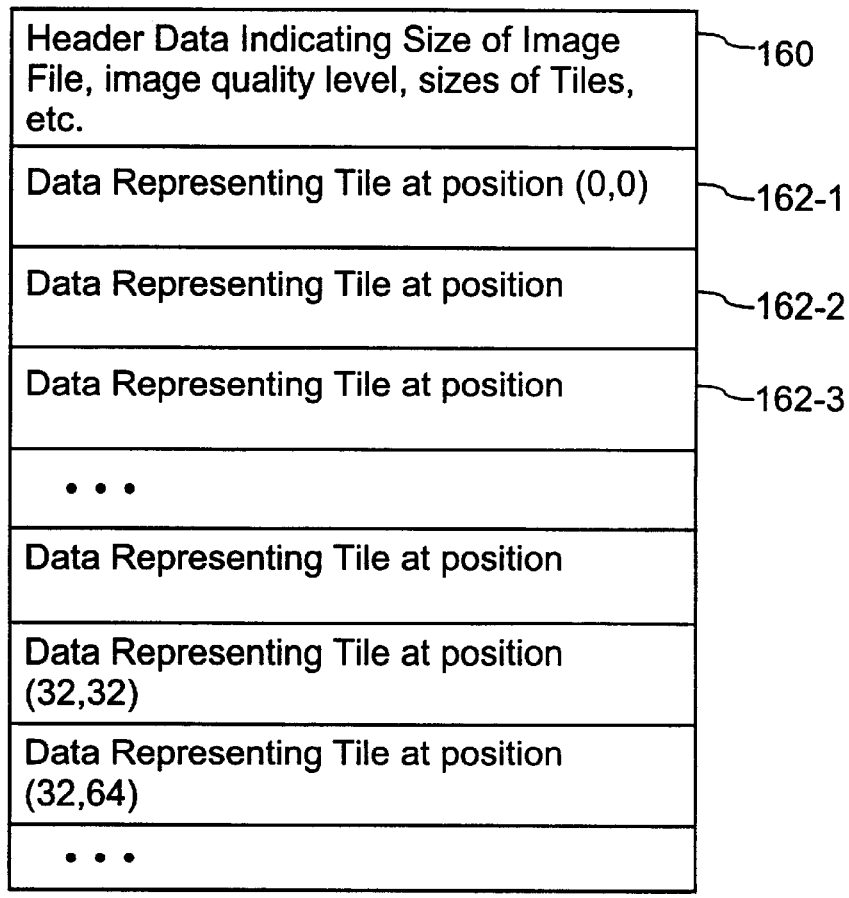
FIGS. 3A and 3B depict image storage data structures.

Referring to FIG. 3A, when all the tiles of an image have been transformed, compressed and encoded, the resulting encoded image data is stored as an image file 132. The image file 132 includes header data 160 and a sequence of data structures 162, each representing one tile. The header data 160 indicates the size of the image file and the image file's quality level. The header data also includes a list of tile size values indicating the length of each of the tile data structures 162, thereby enabling fast indexing into the image data. Storing size values for the tiles enables the camera's data processing circuitry 106 (FIG. 1) to locate the beginning of any tile data structure 162 without having to decode the contents of the earlier tile data structures in the image file 132.

Figure 3B:
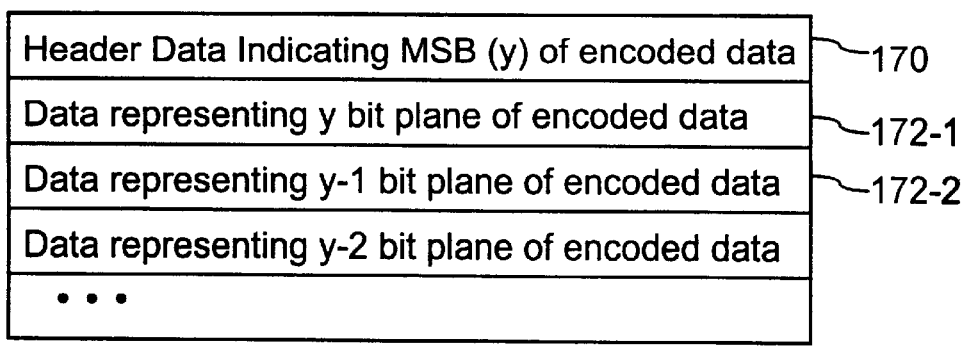

As shown in FIG. 3B, the encoded data 162 representing any one tile is stored in "bit layer order". For each tile, the encoding procedure determines the most significant non-zero bit in the data to be encoded, which is herein called the $y^{th}$ bit. The value of y is determined by computing the maximum number of bits required to encode the absolute value of any data value in the tile. In particular, y is equal to int(log 2V)+1, where V is the largest absolute value of any element in the tile, and "int( )" represents the integer portion of a specified value.

The encoded data 162 representing one tile includes (A) header data 170 indicating the maximum number of bits required to encode the absolute value of any data value in the tile, and (B) a sequence of data structures 172, each representing one bit plane of the elements in the tile. The $x^{th}$ bit plane of the tile is the $x^{th}$ bit of the absolute value of each of the elements in the tile. A sparse data encoding technique is used so that it takes very little data to represent a bit plane that contains mostly zero values. Typically, higher frequency portions of the transformed, quantized image data will contain more zero values than non-zero values, and further most of the non-zero values will have relatively small absolute value. Therefore, the higher level bit planes of many tiles will be populated with very few non-zero bit values.

Digital Camera State Machines

Referring back to FIG. 1, the digital camera 100 preferably includes data processing circuitry 106 for performing a predefined set of primitive operations, such as performing the multiply and addition operations required to apply a transform to a certain amount of image data, as well as a set of state machines 200–212 for controlling the data processing circuitry so as to perform a set of predefined image handling operations. In one embodiment, the state machines in the digital camera are as follows:

One or more state machines 200 for transforming, compressing and storing an image received from the camera's image capture mechanism. This image is sometimes called the "viewfinder" image, since the image being processed is generally the one seen on the camera's image viewer 114. This set of state machines 200 are the ones that initially generate each image file stored in the nonvolatile image memory 108. Prior to taking the picture, the user specifies the quality level of the image to be stored, using the camera's buttons 112.

One or more state machines 202 for decompressing, inverse transforming and displaying a stored image file on the camera's image viewer. The reconstructed image generated by decompressing, inverse transforming and dequantizing the image data is stored in camera's framebuffer 118 so that it can be viewed on the image viewer 114.

One or more state machines 204 for updating and displaying a count of the number of images stored in the nonvolatile image memory 108. The image count is preferably displayed on the user interface display 116. This set of state machines 204 will also typically indicate what percentage of the nonvolatile image memory 108 remains unoccupied by image files, or some other indication of the camera's ability to store additional images. If the camera does not have a separate interface display 116, this memory status information may be shown on the image viewer 114, for instance superimposed on the image shown in the image viewer 114 or shown in a region of the viewer 114 separate from the main viewer image.

One or more state machines 206 for implementing a "viewfinder" mode for the camera in which the image currently "seen" by the image capture mechanism 102 is displayed on the image viewer 114 to that the user can see the image that would be stored if the image capture button is pressed. These state machines transfer the image received from the image capture device 102, possibly after appropriate remedial processing steps are performed to improve the raw image data, to the camera's framebuffer 118.

One or more state machines 208 for downloading images from the nonvolatile image memory 108 to an external device, such as a general purpose computer.

One or more state machines 210 for uploading images from an external device, such as a general purpose computer, into the nonvolatile image memory 108. This enables the camera to be used as an image viewing device, and also as a mechanism for transferring image files on memory cards.

Tiled Wavelet Transform Method

The following naming convention will be used in this document to identify transform coefficients generated in a sequence of transform steps. In particular, the names assigned to the sets of low spatial frequency coefficients generated by the sequence of transform filtering steps are shown in Table 1.

TABLE 1

| Step # | Transform Filtering Step | Name Assigned to Resulting Set of Low Spatial Frequency Coefficients |
|---|---|---|
| 1 | L1 Horizontal | LL1/0 |
| 2 | L1 Vertical | LL1/1 |
| 3 | L2 Horizontal | LL2/1 |
| 4 | L2 Vertical | LL2/2 |
| 5 | L3 Horizontal | LL3/2 |
| 6 | L3 Vertical | LL3/3 |
| 7 | L4 Horizontal | LL4/3 |
| 8 | L4 Vertical | LL4/4 |

The tiled wavelet-like transform method of the present invention is designed to generate wavelet coefficients that are the same, or very close to being the same, as those that would be generated if the same wavelet-like transform were applied to the entire image data array as a single tile, instead of being applied to a large number of small tiles. Normally this would not be possible, because the intermediate layer LL transform coefficients (e.g., LL1/1 or LL2/2) from one tile are not available to use when processing neighboring tiles. More specifically, these intermediate layer LL transform coefficients are destroyed by the later layers of the transform. For instance, the "LL1/1" coefficients from the first layer transform are the coefficients that are processed during the second layer and are converted into HL2, HH2, LH2 and LL2/2 (i.e., second layer) coefficients.

However, the present invention overcomes this difficulty by providing temporary storage for only those of the intermediate LL layer transform coefficients that are actually needed when processing neighboring tiles. By preserving these intermediate LL layer transform coefficients, the undesirable boundary effects of applying a wavelet-like transform to small image tiles is substantially eliminated.

Figure 4:
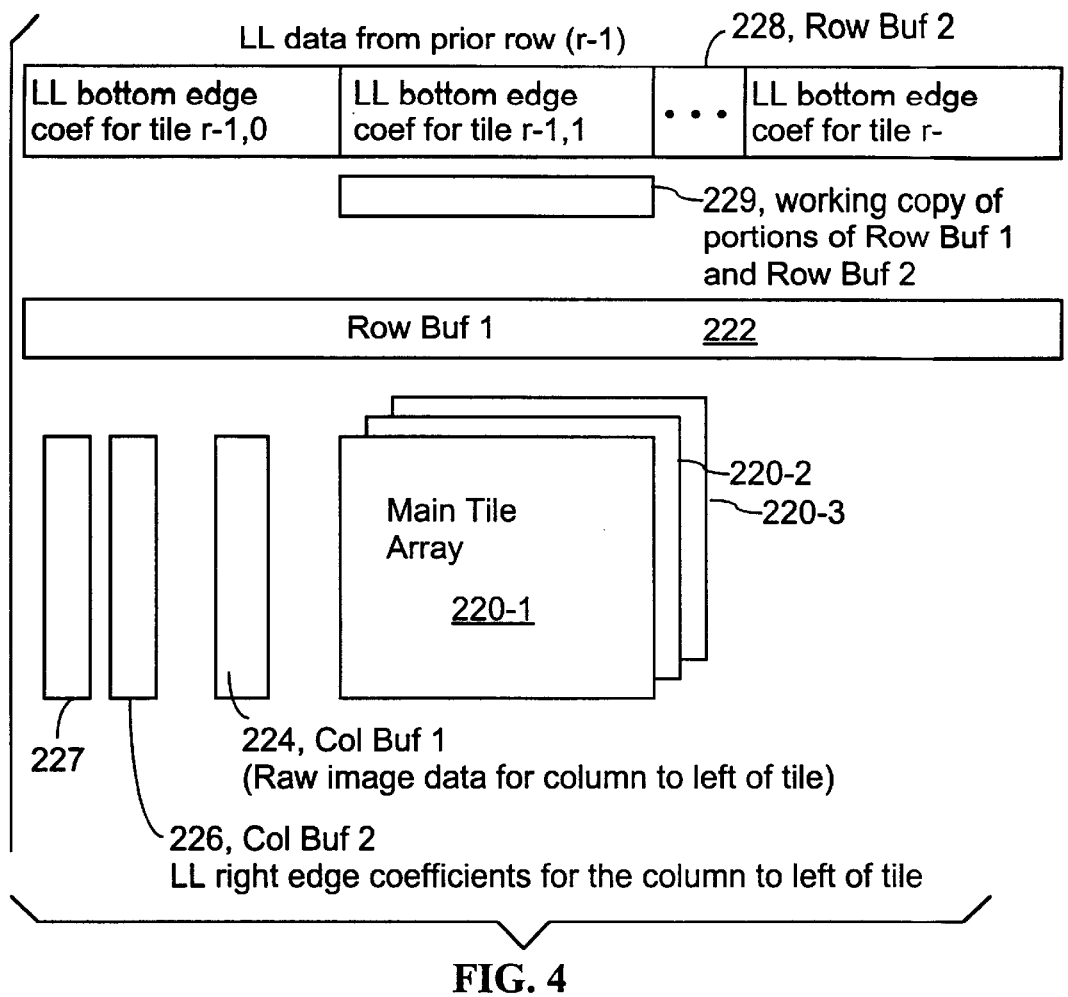
FIGS. 4, 5A and 5B depict data structures used to store image data and coefficients in working memory.

FIG. 4 shows the data structures used to store image data and coefficients in working memory. A main tile array 220 is used to initially store one tile of raw image data, and also to store transform coefficients as they are generated. Three main tile arrays 220-1, 220-2, 220-3 are shown because the preferred embodiment uses three main tile arrays in rotating order to enable pipelined processing of image tiles. The image processing circuitry has three pipeline stages: a wavelet-like transform stage, a transform coefficient quantization stage, and an encoding stage. Data in each main tile array 220 is processed by the three pipeline stages before it is used to process a next tile of image data.

In the following explanations of the operation of the preferred embodiments of the invention, it is assumed that the data decomposition transform uses horizontal filtering first and then vertical filtering, for each layer of the transform. However, it would be just as valid to perform vertical filtering before horizontal filtering. In that case, the roles of the row and column buffers 222, 224, 226, 227 discussed below would have to be adjusted accordingly. For simplicity and clarity, the operation of the invention will be explained only for the "horizontal followed by vertical" filtering order implementation, with occasional mention of how various data structures would be used in a vertical followed by horizontal filtering order implementation.

Similarly, it would be just as valid to process the image array from bottom to top, or left to right, as the top to bottom and left to right processing directions used in the preferred embodiment. In such alternate embodiments the data stored in the row and column buffers 222, 224, 226, 227 would be adjusted to take into account the processing direction(s).

The following data structures are used to store data in the working memory:

array 222, also called Row Buf 1, is used to store "reflected data" if the tile being processed is at the top of the image, and is otherwise used to store the LL1/0 coefficients for the bottom row of the tile immediately above the tile being processed. These LL1/0 coefficients are produced by the layer 1 horizontal transform of the tile above the current tile. Row Buf 1 (222) preferably has a size equal to one row of the image array. Alternately, the LL1/0 coefficients can be easily regenerated from the raw data for the row of pixels above the current tile, by performing horizontal wavelet-like filtering of that data. In this implementation, Row Buf 1 (222) has a size of 1×33 (so as to include one datum before the row of pixels above the current tile) when the tile size is 32×32;

array 224, also called Col Buf 1, is used to store the raw image data for the column immediately to the left of the tile being processed, except that for tiles along the left edge of the image Col Buf 1 is used to store "reflected data;"

array 226, also called Col Buf 2, is used to store the LL right edge coefficients for the tile, if any, immediately to the left of the tile being processed; Col Buf 2 (226) has a size of 28×1 when the tile size is 32×32 and four transform layers are used; and array 228, also called Row Buf 2, is used to store the LL bottom edge coefficients for the row of tiles, if any, immediately above the row of tiles currently being processed.

When Row Buf 1 (222) is used to store "reflected data" for a tile at the top of the image, the reflected data is second topmost row of first layer transform coefficients generated by the first layer horizontal filtering (i.e., before the application of first layer vertical filtering). In other words, during the first layer transform, after horizontal filtering is performed, the coefficients generated for the second topmost row of the tile are copied into Row Buf 1 (222). If vertical filtering is being performed before horizontal filtering, then raw image data for the row above the tile is copied into Row Buf 1 prior to the first layer transform of the tile, except if the tile being processed is in the top row of tiles, in which case Row Buf 1 is filed with a copy of the raw image data for the second row of the tile being processed.

When Col Buf 1 (224) is used to store "reflected data" for a tile along the left edge of the image, if horizontal filtering is being performed first, the reflected data is the second leftmost column of image data in the tile. In implementations in which vertical filtering is performed before horizontal filtering, the reflected data stored in Col Buf 1 (224) are the second leftmost column of first layer transform coefficients generated by the first layer vertical filtering (i.e., before the application of first layer horizontal filtering). In other words, during the first layer transform, after vertical filtering is performed, the coefficients generated for the second leftmost column of the tile are copied into Col Buf 1 (224).

The contents of arrays 228 and 226 are explained in more detail with reference to FIGS. 5A and 5B. In this explanation, it is assumed that horizontal filtering is performed first for each transform layer, and that four transform layers are being applied to the image.

Figure 5A:
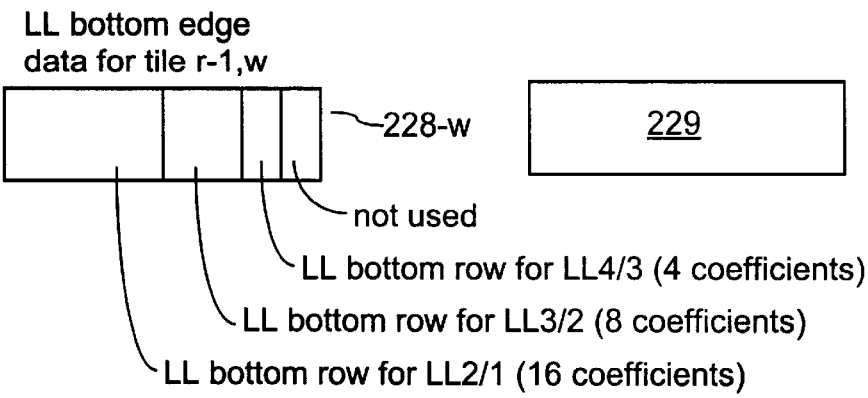

As shown in FIG. 5A, array 228 (Row Buf 2) stores the bottom row of the LL2/1 coefficients, the bottom row of the LL3/2 coefficients, and the bottom row of the LL4/3 coefficients (which are the final LL coefficients if four layers of transforms are applied). Subarray 228-w represents the section of array 228 used for one column of tiles. The LL2/1, LL3/2 and LL4/3 coefficients are intermediate LL coefficients because they are coefficient values that no longer exist when the tile transformation process is completed. They exist only at the completion of their respective transform layers. Array 229 is used to temporarily store LL coefficients that are to be copied into array 228-w or array 222.

Figure 5B:
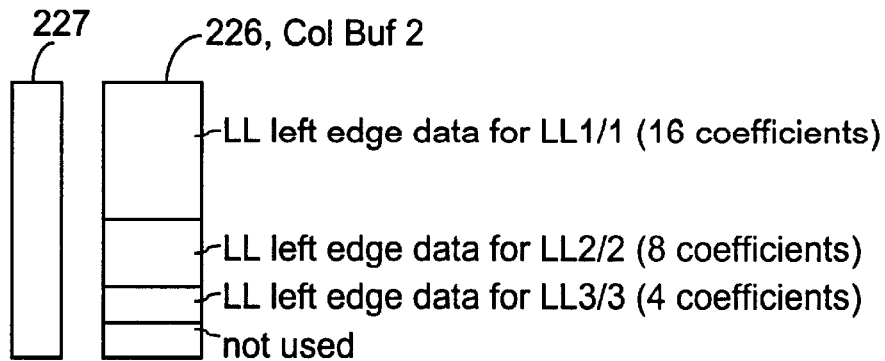

Similarly, as shown in FIG. 5B, array 226 stores the right hand column of the LL1/1 coefficients, the right hand column of the LL2/2 coefficients, and the right hand column of the LL3/3 coefficients (which are next to last LL coefficients if four layers of transforms are applied). The LL1/1, LL2/2 and LL3/3 coefficients are intermediate LL coefficients because they are coefficient values that no longer exist when the tile transformation process is completed. They exist only at the completion of their respective transform layers. Array 227 is used to temporarily store LL coefficients that are to be copied into array 226 and raw data that is to be copied into array 224 (Col Buf 1).

Figure 6:
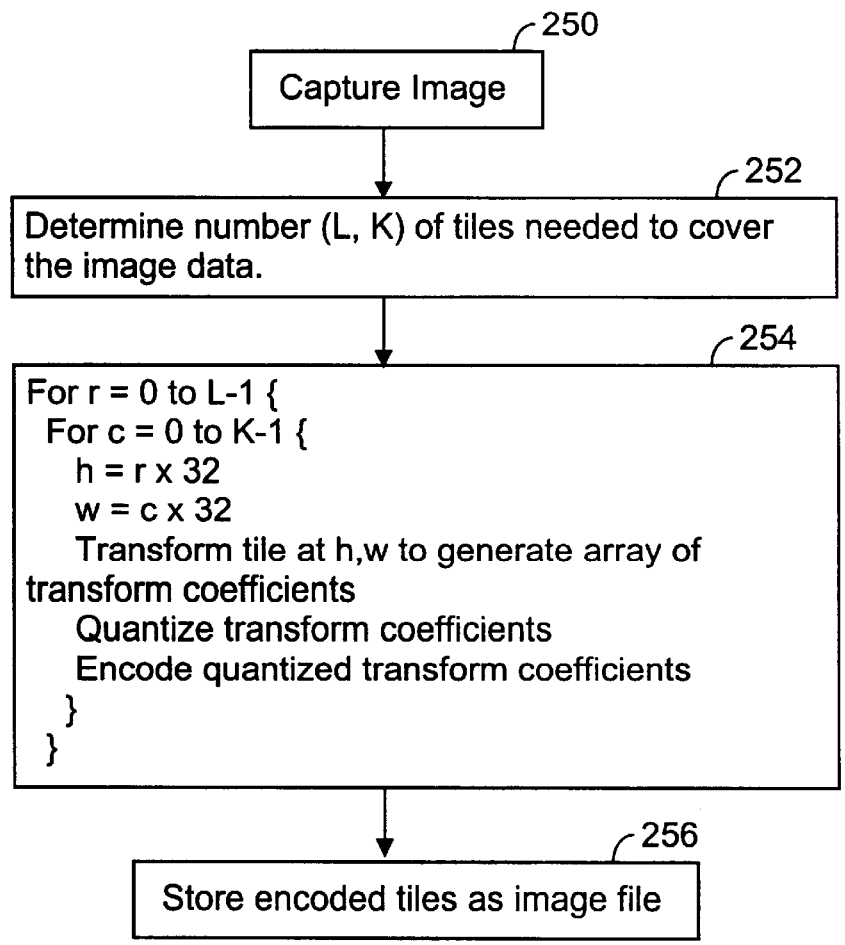
FIG. 6 is a high level flow chart of an image processing process to which the present invention can be applied.

Referring to FIG. 6, the process for generating an image file begins when an image is captured by the image capture device (step 250). If the image size is variable, the size of the captured image is determined and the number of rows and columns of tiles needed to cover the image data is determined (step 252). If the image size is always the same, step 252 is not needed.

Next, all the tiles in the image are processed, in raster scan order, by applying a wavelet-like decomposition transform to them in both the horizontal and vertical directions, then quantizing the resulting transform coefficients, and finally by encoding the quantized transform coefficients using a sparse data compression and encoding procedure (step 254). A pseudocode representation of step 254 is provided in Table 2. Finally, after all the tiles in the image have been processed, an image file containing all the encoded tiles is stored in non-volatile memory (step 256).

The wavelet-like decomposition transform used in step 254 is described in more detail below, with reference to FIGS. 7A, 7B and 7C. The sparse data compression and encoding procedure is described in detail in U.S. patent application Ser. No. 08/858,035, filed May 16, 1997, entitled "System and Method for Scalable Coding of Sparse Data Sets," now U.S. Pat. No. 5,949,911, which is hereby incorporated by reference as background information.

Wavelet-Like Decomposition of One Tile

Figure 7A:
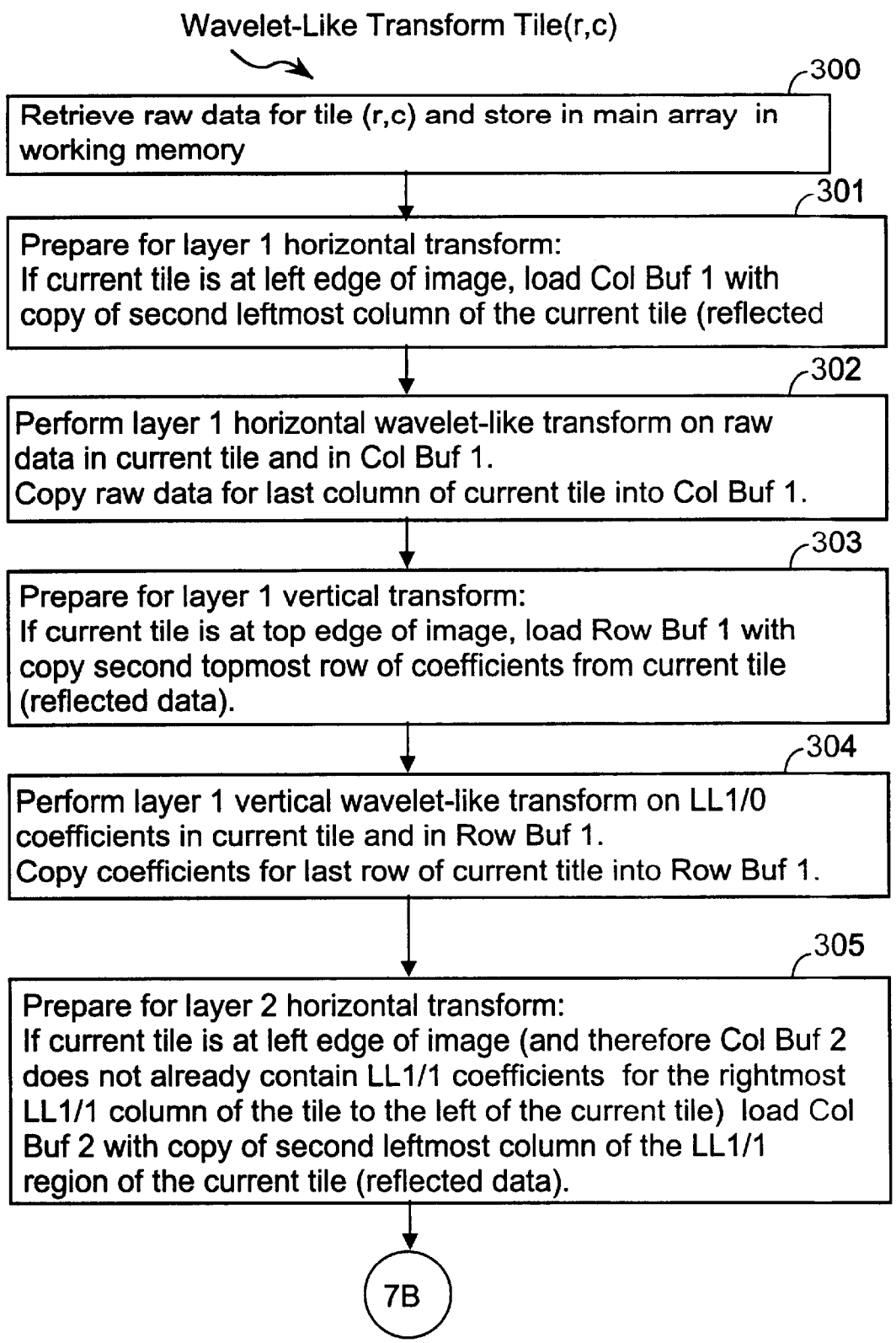
FIGS. 7A, 7B and 7C depict a flow chart of a memory efficient wavelet-like data transformation procedure.
Figure 7B:
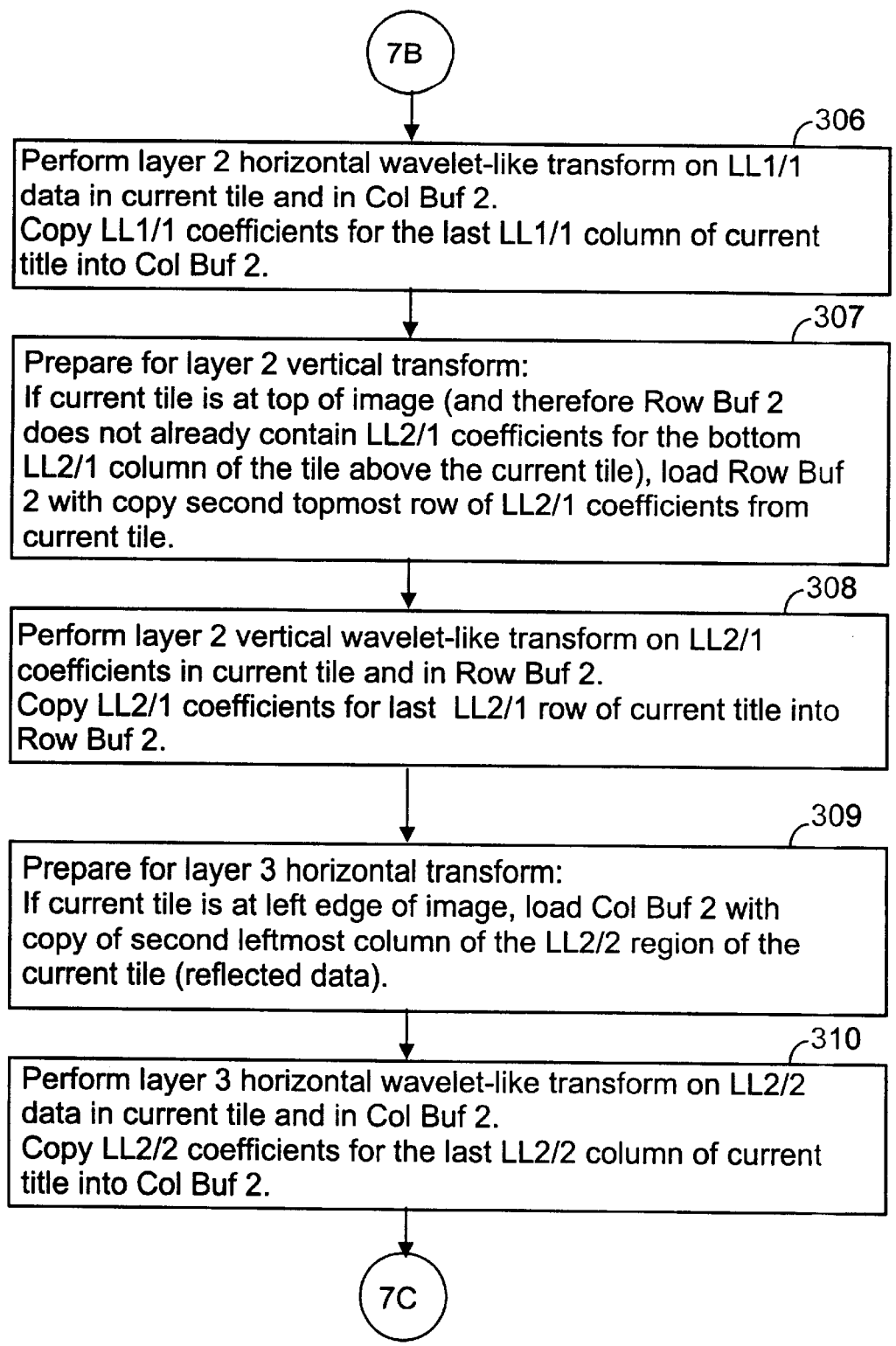
Figure 7C:
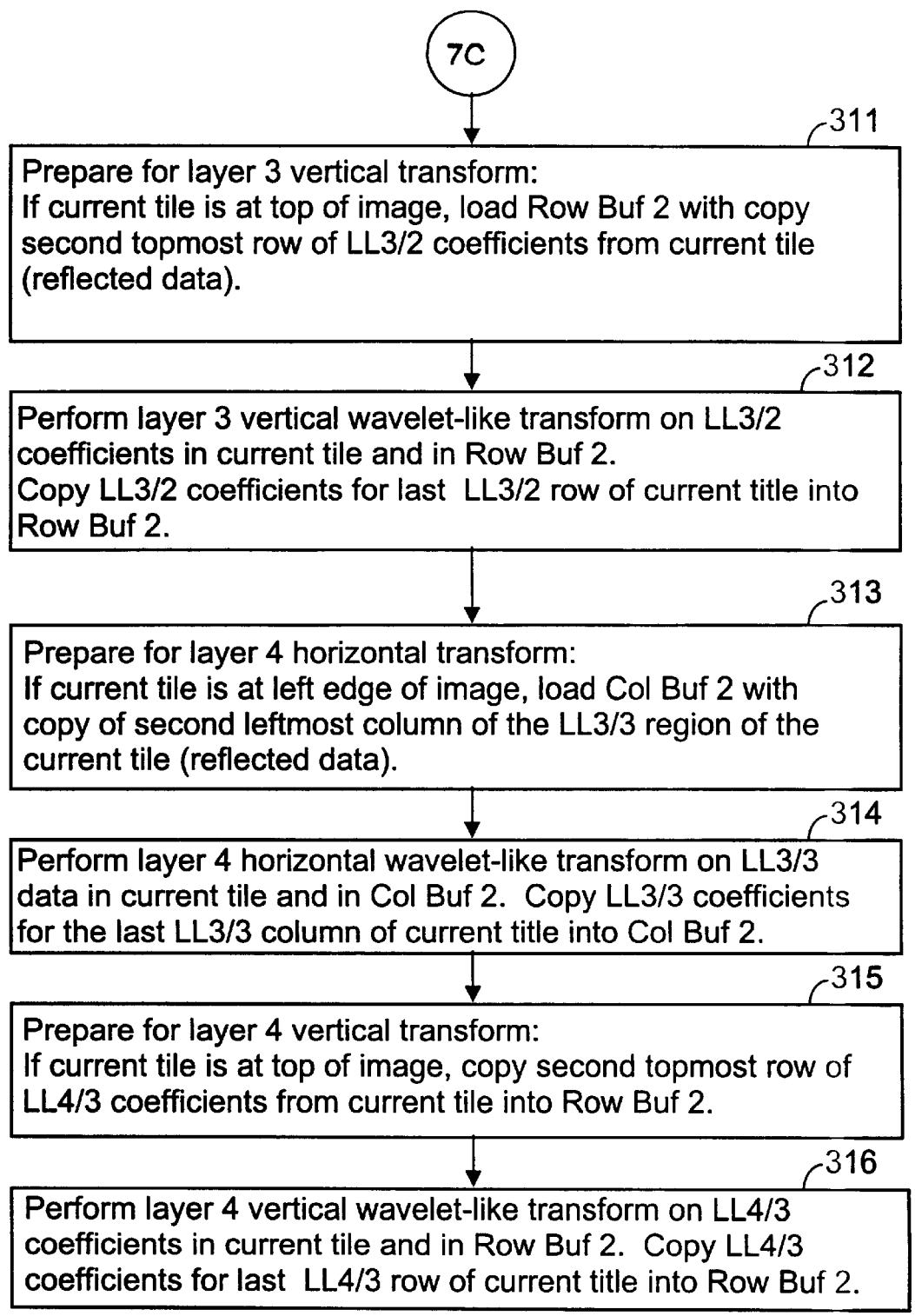
Figure 8A:
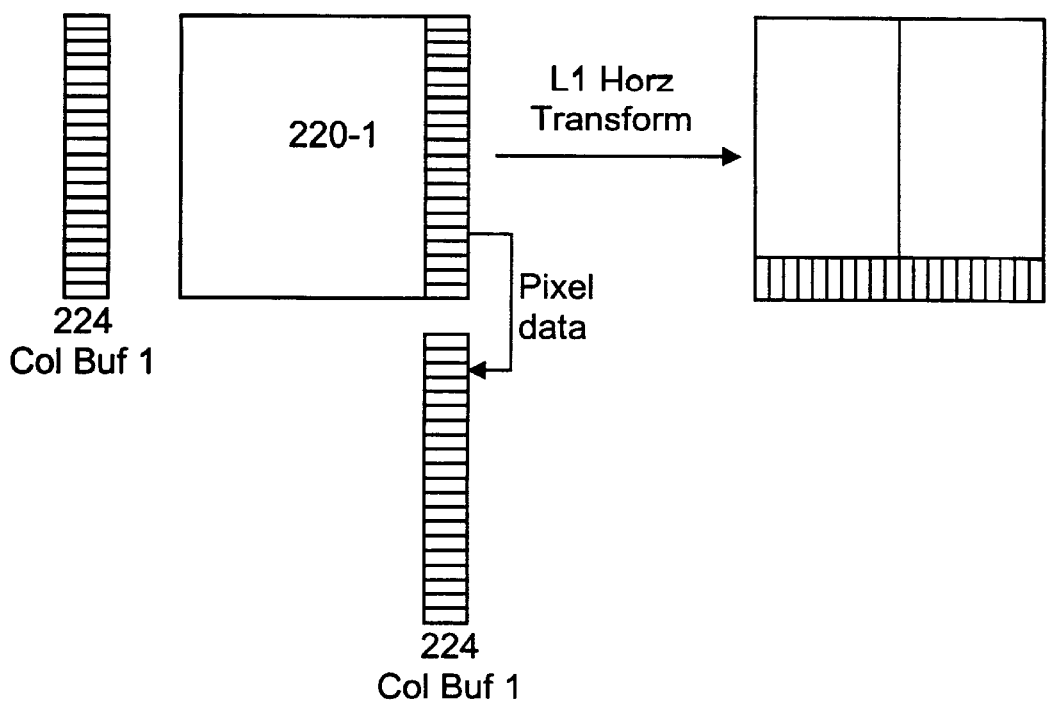
FIGS. 8A, 8B, 8C and 8D depict the use of the working memory data structures of FIG. 4 during four wavelet-like transform steps (for two transform layers).
Figure 8B:
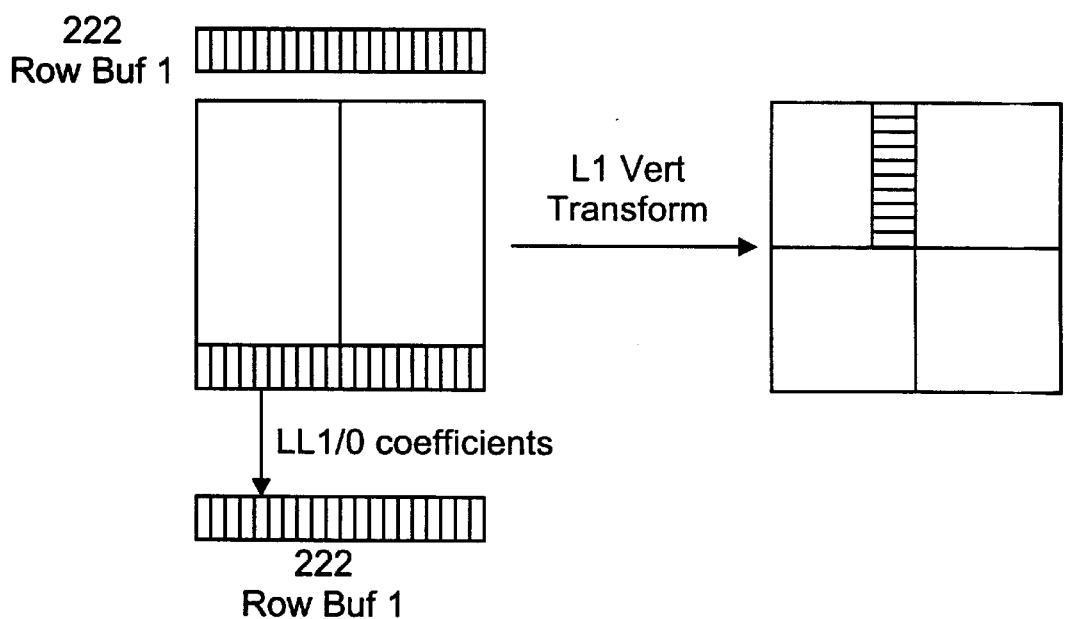
Figure 8C:
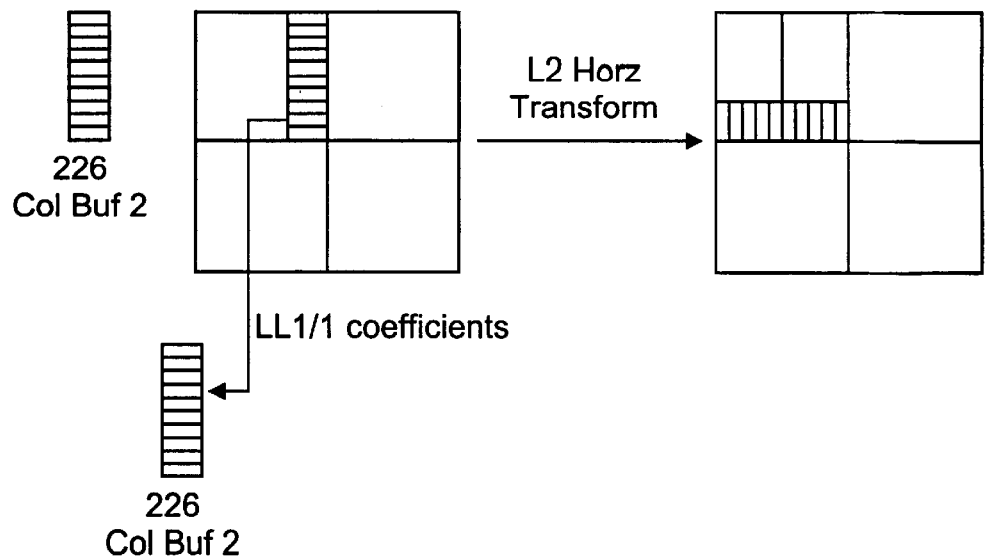
Figure 8D:

FIGS. 7A–7C represent the steps of a four layer decomposition process, and FIGS. 8A–8D schematically represent the wavelet-like transformations and intermediate coefficient storage and usage for the first two horizontal and vertical transformation layers of that process. The processing of a tile begins by loading the raw image data for the tile into the main array 220 (see FIG. 4) (step 300). If the tile is not in the leftmost column of tiles, array 224 (Col Buf 1) is loaded with the raw data for the column before the tile, otherwise Col Buf 1 is loaded with "reflected data" consisting of a copy of the second leftmost column of the tile (step 301).

Next, first layer (layer 1) horizontal and vertical wavelet-like decomposition transforms (steps 302, 304) are applied to the raw data in the main array (220) and in the prior data arrays (222, 224). In a preferred embodiment, the data is filtered horizontally and then vertically. The horizontal filtering in step 302 is performed on the raw data for the current tile and the data in Col Buf 1, which is treated as being a column of data to the left of the tile. Before horizontal filtering the raw data for the last column of the current tile is copied into buffer 227, and after the filtering that data is copied from buffer 227 into Col Buf 1, for use with the next tile (if any) to the right of the current tile.

After the horizontal filtering and before the vertical filtering, if the current tile is at the top of the image, the generated coefficients for the second topmost row of the tile are copied into Row Buf 1 (step 303). Then the current tile is vertically filtered using the data in Row Buf 1 as the row immediately above the current tile (step 304). In addition, before vertical filtering the coefficients in the last row of the tile are copied into buffer 229, and after the filtering that data is copied from buffer 229 into Row Buf 1, for use with the next tile (if any) to below the current tile.

If, in an alternate embodiment, vertical filtering were performed before horizontal filtering for each transform layer, then the roles of arrays 222 and 224 would be reversed: raw image data or reflected image data would be stored in Row Buf 1 prior to the first layer transform, and coefficients generated by the vertical filtering would be copied to Col Buf 1 before the horizontal filtering.

In another alternate embodiment, the last column of raw data is not copied to Col Buf 1 in step 302 and the last row of LL1/0 coefficients is not copied to Row Buf 1 in step 304. Instead, in step 301 Col Buf 1 is loaded with the raw data for the last column of the tile to the left of the current tile, and in step 303 Row Buf 1 is loaded with the raw data for the row immediately above the current tile and one extra datum to the left, and then that is horizontally filtered to regenerate the LL1/0 coefficients needed for vertical filtering step 304.

In a preferred embodiment, the wavelet-like decomposition and reconstruction transform filters are asymmetric, extending over each tile boundary on a first side, but not extending over the tile boundary on a second side. More specifically, in the preferred embodiment the wavelet-like transform that is applied is actually two filters. A first filter, T1, is used to generate the first two and last three coefficients in the row or column of transform coefficients that are being generated, and a second filter T2, is used to generate all the other coefficients in the row or column of transform coefficients being generated. More generally, a short filter T1 is used to transform data near the edges of the tile, while a longer filter T2 is used to transform the data away from the edges of the tile. Further, the short filter is preferably asymmetric, so that when it is applied to one edge is does not use data from outside the tile, while for the opposite edge it does use data from outside the tile. The T1 and T2 decomposition filters are defined as follows:

T1 TRANSFORM (ShortFilter):

$$\tilde{x}_{2i} = x_{2i} - \frac{x_{2i-1} + x_{2i+1}}{2} \text{HighFreq}$$

$$\tilde{x}_{2i+1} = x_{2i+1} + \frac{\tilde{x}_{2i+2} + \tilde{x}_{2i}}{4} \text{LowFreq}$$

$$\tilde{x}_{2i+1} = x_{2i+1} + \frac{\tilde{x}_{2i}}{4} \text{LowFreq: Last } \tilde{x}_{2i+1} \text{ only}$$

T2 TRANSFORM (LongFilter):

$$\tilde{x}_{2i} = x_{2i} - \frac{x_{2i-1} + x_{2i+1}}{2} - \frac{(x_{2i-1} + x_{2i+1}) - (x_{2i-3} + x_{2i+3})}{16} \text{HighFreq}$$

$$\tilde{x}_{2i+1} = x_{2i+1} + \frac{\tilde{x}_{2i+2} + \tilde{x}_{2i}}{4} + \frac{(\tilde{x}_{2i} + \tilde{x}_{2i+2}) - (\tilde{x}_{2i-2} + \tilde{x}_{2i+4})}{32} \text{LowFreq}$$

The T1 decomposition transform is used to generate the coefficients at the edges because it requires only one value outside the tile being processed, while the T2 decomposition transform would require more values outside the tile being processed because of the wider range of data being processed. In the equations above, the x values represent the data to which the decomposition transform is being applied, and the $\tilde{x}$ values represent the computed transform coefficients.

The wavelet-like decomposition transform is typically applied to all the rows of the tile, and then is applied to all the columns of the tile to perform the first layer transform. Further, during each layer of the decomposition process, the coefficients at the even positions (i.e., the $\tilde{x}_{2i}$ values) must be computed before the coefficients at the odd positions (i.e., the $\tilde{x}_{2i+1}$ values).

In an alternate embodiment, the short T1 decomposition transform is used to filter all data, not just the data at the edges. Using only the short T1 decomposition transform reduces computation time and complexity. This also reduces the computation time to decode an image file that contains an image encoded using the present invention, because only the corresponding short T1 reconstruction transform (described below) is used during image reconstruction.

Figure 9:
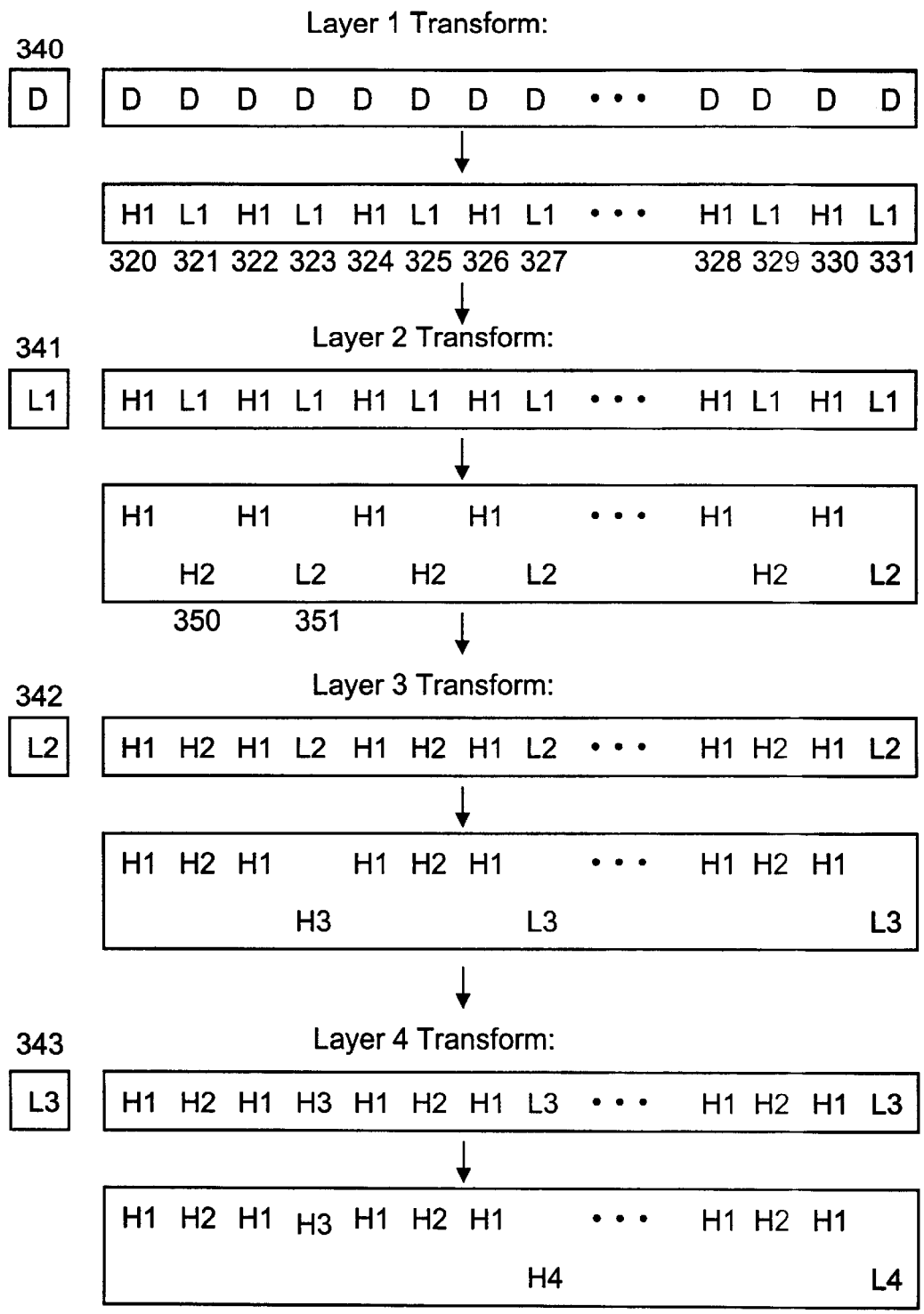
FIG. 9 shows, for each of four successive transform layers, a before and after representation of data stored in one row of the main array and in one corresponding element of the prior column array.

Referring to FIG. 9 and to the T1 and T2 filter equations shown above, the transform will be explained with reference to a horizontal application of the T1 and T2 transform filters. FIG. 9 shows, for each of four successive transform layers, a before and after representation of the data stored in one row of the main array and in one corresponding element of the prior column array—that is before and after the transform layer is performed.

The exact same filter techniques are used for vertical application of the wavelet-like decomposition transform. Note that datum 340 in FIG. 9 represents one datum in either array 224 (FIG. 4), for horizontal applications of the wavelet-like decomposition transform, or array 222 for vertical applications of the wavelet-like decomposition transform. Similarly, data values 341, 342, 343 represent intermediate LL values in either array 226 or 228, depending on whether horizontal or vertical processing is being performed.

In the layer 1 transform the leftmost H1 and L1 coefficients (320, 321), as well as the rightmost H1 and L1 coefficients (330, 331), are generated using the T1 filter. Note that the rightmost L1 coefficient (331) is generated using a special version of the T1 filter used only for generating the last L coefficient of each row or column. As a result, the leftmost H1 coefficient 320 is computed using the rightmost data value 340 from the tile to the left of the present tile. To generate the leftmost L1 coefficient 321, the T1 filter does not require any data from outside the current tile, except that it uses the leftmost H1 coefficient 320 as an input and the H1 value depends on data outside the current tile. For the rightmost H1 and L1 coefficients (330, 331), the T1 filter does not use any data outside the current tile.

The T2 transform filter is used to compute all the other coefficients 322–328 away from the edges of the tile. Since these coefficients are not positioned along the edge of the tile, the data values used as input to this filter fall within the current tile and the column 340 immediately to the left of the current tile. More specifically, the input data values to the filter range from three positions to the left to three positions to the right of the H1 coefficient being generated. As can be seen, for H1 coefficient 322 near the left side of the tile, this includes data value 340 from the prior tile, but for H1 coefficient 328 near the right side of the tile it includes only data from within the current tile.

Still referring to FIG. 9, each successive transform layer is applied only to the L coefficients generated by the prior layer, as well as to the rightmost prior layer L coefficient from the tile to the left. Thus, in the layer 2 transform, the rightmost L1 coefficient 341 from the tile to the left is used to compute the leftmost H2 and L2 coefficients 350, 351.

Depending on the size of the tile, some of the later transform layers may use only the T1 decomposition filter if the total number of coefficients being generated for that layer is four or less.

TABLE 2

Pseudocode for Tile Transform Procedure

```
Clear prior row data array;
For r = 0 to last row {
    For c = 0 to last col {
        Retrieve raw data for tile (r,c) and store in main array;
        If c=0, copy second column to tile into Col Buf 1;
        Transform raw image data, using prior column data, and prior LL edge data, to
            produce transform coefficients;
        {
        During first layer transform:
            During horizontal filtering: copy last column of raw data into Col Buf 1.
            Before vertical filtering: if current tile is at top of image, load Row Buf 1 with
            copy of second topmost row of LL1/0 coefficients from current tile.
            During vertical filtering: copy last row of LL1/0 coefficients into Row Buf 1.
```

TABLE 2-continued

Pseudocode for Tile Transform Procedure

```
            During each later layer transform:
                Before horizontal filtering: if current tile is at left edge of image, load Col Buf
                2 with reflected data.
                During horizontal filtering, load Col Buf 2 with last column of prior level LL
                data of current tile.
                Before vertical filtering: if current tile is at left edge of image, load Row Buf 2
                with reflected data.
                During vertical filtering, load Row Buf 2 with last row of prior level LL data
                of current tile.
            }
        Quantize transform coefficients; /* performed by second pipeline stage
        Encode quantized transform coefficients; /* performed by third pipeline stage
        } /* end of column loop
    } /* end of row loop
```

Referring again to FIGS. 7A–7C, 8A–8D and the data structures in FIG. 4, explanation of the decomposition transform process resumes at step 304. Note that the transform process through the first layer transform, ending at step 304, was described above. At steps 305, 306, 307, 308, the second layer decomposition transform is performed in both the horizontal and vertical directions. The transform is applied to: (A) the LL1/1 coefficients generated by first layer decomposition transform, and (B) the edge coefficients from the tiles to the left and above the current tile, saved in Col Buf 2 and Row Buf 2 (arrays 226 and 228).

Prior to the horizontal transform step 306, reflected data (from the second leftmost column of the tile) is copied into Col Buf 2 if the current tile is at the left edge of the image (step 305). Similarly, prior to the vertical transform step 308, reflected data (from the second topmost row of the tile) is copied into Row Buf 2 if the current tile is at the top edge of the image (step 307).

Further, and most importantly, during the horizontal transform step 306 the right edge LL1/1 coefficients generated by the first layer transforms are saved in Col Buf 2, and during the vertical transform step the bottom edge LL2/1 coefficients generated by the second layer horizontal transform are saved in Row Buf 2, for use when processing the tiles to the right and below the current tile. However, since Col Buf 2 and Row Buf 2 contain LL1/1 and LL2/1 values needed by the current, second layer transforms, the right edge LL1/1 and bottom edge LL2/1 coefficients for the current tile are first copied to temporary arrays 227 and 229, respectively, prior to the second layer horizontal and vertical transforms. At the completion of the second layer transforms the LL1/1 right edge and LL2/1 bottom edge coefficients in the two temporary arrays 227 and 229 are copied to the appropriate locations of Col Buf 2 and Row Buf 2 (arrays 226 and 228).

The step of copying of the bottom edge coefficients can be skipped for tiles in the bottom row of tiles and the copying of the right edge coefficients can be skipped for tiles in the rightmost row of tiles, since those edge coefficients will never be used while processing other tiles. This also applies to the bottom and right edge coefficients generated during the third and fourth decomposition transforms.

At steps 309–312, the third layer decomposition transform is performed in both the horizontal and vertical directions. The steps of the third layer decomposition transform are basically the same as those for the second layer transform. The third layer horizontal transform step 310 is applied to the LL2/2 coefficients generated by the second layer decomposition transform and the LL2/2 edge coefficients stored in Col Buf 2. The third layer vertical transform step 312 is applied to the LL3/2 coefficients generated by the third layer horizontal transform and the LL3/2 coefficients stored in Row Buf 2. Transform preparation steps 309 and 311 are the same as those described above for steps 305 and 307, except that the reflected data are now LL2/2 and LL3/2 coefficients. Also, as described above with respect to the second layer transform, the temporary arrays 227 and 229 are used to temporarily store LL2/2 and LL3/2 coefficients that copied into the appropriate locations of Col Buf 2 and Row Buf 2 at the completion of the layer three transform steps.

Finally, at steps 313–316, the fourth layer decomposition transform is performed in both the horizontal and vertical directions. The steps of the fourth layer decomposition transform are basically the same as those for the second and third layer transforms. In particular, the fourth layer horizontal transform step 314 is applied to the LL3/3 coefficients generated by the third layer decomposition transform and the LL3/3 edge coefficients stored in Col Buf 2. The fourth layer vertical transform step 316 is applied to the LL4/3 coefficients generated by the fourth layer horizontal transform and the LL4/3 coefficients stored in Row Buf 2. Transform preparation steps 313 and 315 are the same as those described above for steps 305 and 307, except that the reflected data are now LL3/3 and LL4/3 coefficients. Also, as described above with respect to the second layer transform, the temporary arrays 227 and 229 are used to temporarily store LL3/3 and LL4/3 coefficients that copied into the appropriate locations of Col Buf 2 and Row Buf 2 at the completion of the layer three transform steps.

Note that the left edge LL4/4 coefficients are not copied to arrays 226 and 228, since those coefficients are not needed when performing transforms on the tiles to the right and below the current tile. Alternately, if the LL4 coefficients are copied to arrays 226 and 228, they are not used when processing the neighboring tiles. More generally, if N transform layers are being applied to each tile, the Nth layer LL coefficients are not copied to arrays 226 and 228, while the right edge and bottom edge LL coefficients for the prior transform layers are copied to arrays 226 and 228.

Full Line Tiles

In some applications, such as digital cameras having enough working memory to store 16 or more rows of pixels of a captured image (actually three copies of the 16 rows of pixels, for a three stage pipelined device), some of the complexity of the present invention can be reduced by using tiles whose size is L×H, where L is the full row length of the image to be processed and H is the height of tile; H will typically be equal to 8, 16 or 32, but could be as small as 4 or as large as 128, depending on the amount of available memory. In any case, when the processing tiles are as wide as the image, the right edge arrays 224, 226 and 227 can be eliminated because there are no tiles neighboring in the horizontal direction, and thus all of the operations required to load image data and LL coefficients into these arrays are no longer needed. Further, in this embodiment, the 222 array must be as long as the width of the image, since the edge image data is now as long as the entire image's width. Actually, the 228 array can be the same length as the image's width, or can be shorter than the image width by the number of LL coefficients generated by the last transform layer (e.g., the LL4/4 coefficients in the example given above), since those coefficients are not needed for processing the neighboring tile. For example, in a four layer transform system, array 228 can have a length of seven eighths of the image width.

Other Applications of the Invention

The present invention is suitable for use in other contexts than digital cameras. For instance, it can be used in image scanners, printers, and even in image processing software. Generally, the present invention is useful in any "memory conservative" context where the amount of working memory available is insufficient to process entire images as a single tile, or where a product must work in a variety of environments including low memory environments.

Image Reconstruction

To reconstruct an image from an image file, each tile of data in the image file is decompressed, de-quantized, and then an inverse transform is applied to the dequantized data (i.e., the dequantized transform coefficients) to reconstruct the image data in that tile.

The wavelet-like inverse transform for reconstructing an image from the dequantized transform coefficients is defined as follows. A first filter, T1-R, is used to reconstruct the first two and last three data values in the row or column of data values that are being reconstructed, and a second filter T2-R, is used to generate all the other data values in the row or column of transform coefficients being reconstructed.

The T1 and T2 reconstruction filters are defined as follows:

*T1-R* RECONSTRUCTION TRANSFORM (ShortFilter):

$$x_{2i+1} = \tilde{x}_{2i+1} - \frac{\tilde{x}_{2i+2} + \tilde{x}_{2i}}{4} \quad \text{OddPosition(s)}$$

$$x_{2i+1} = \tilde{x}_{2i+1} - \frac{\tilde{x}_{2i}}{4} \quad \text{Last } x_{2i+1} \text{ Position only}$$

$$x_{2i} = \tilde{x}_{2i} + \frac{x_{2i-1} + x_{2i+1}}{2} \quad \text{EvenPosition(s)}$$

*T2-R* RECONSTRUCTION TRANSFORM (LongFilter):

$$x_{2i+1} = \tilde{x}_{2i+1} - \frac{\tilde{x}_{2i+2} + \tilde{x}_{2i}}{4} - \frac{(\tilde{x}_{2i} + \tilde{x}_{2i+2}) - (\tilde{x}_{2i-2} + \tilde{x}_{2i+4})}{32} \text{Odd Positions}$$

$$x_{2i} = \tilde{x}_{2i} - \frac{x_{2i-1} + x_{2i+1}}{2} - \frac{(x_{2i-1} + x_{2i+1}) - (x_{2i-3} + x_{2i+3})}{16} \text{Even Positions}$$

During each layer of the reconstruction process, the data values at odd positions (i.e., the $x_{2i+1}$ values) must be computed before the data values at the even positions (i.e., the $x_{2i}$ values).

Figure 10A:
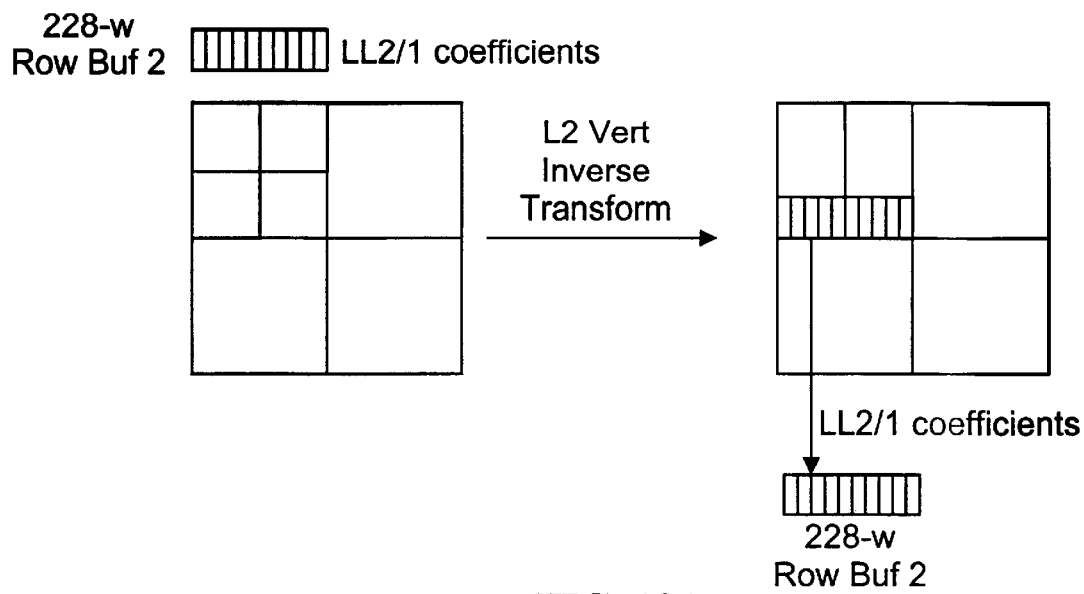
FIGS. 10A, 10B, 10C and 10D depict the use of the working memory data structures of FIG. 4 during four inverse wavelet-like transform steps (for two transform layers).
Figure 10B:
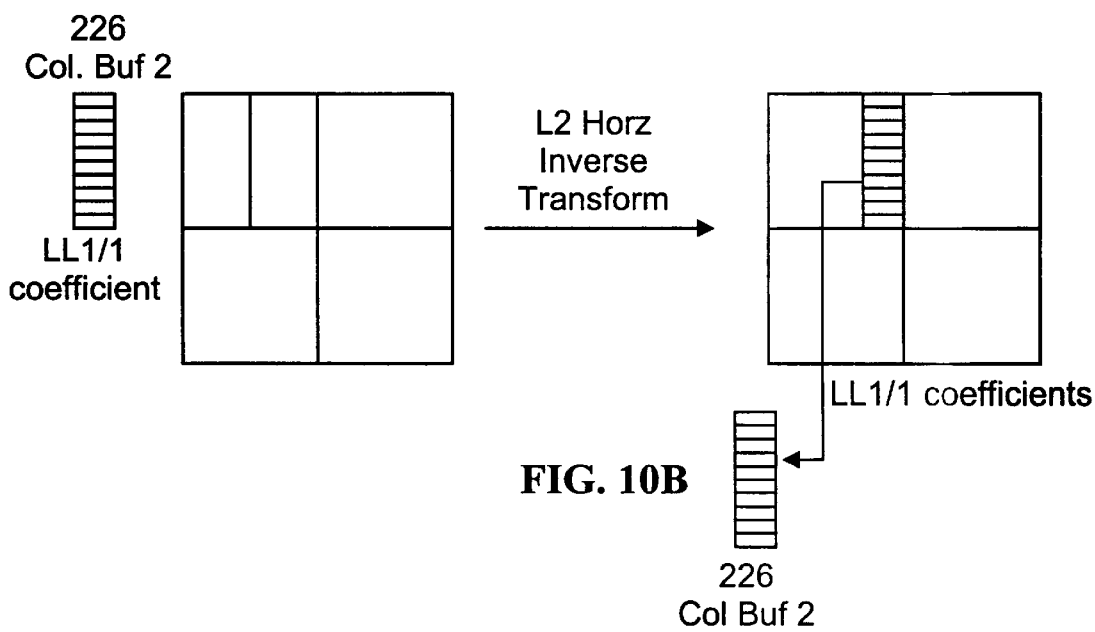

FIGS. 10A–10D show the use of the Row Buf 2 and Col Buf 2 arrays during image reconstruction. In particular, FIG. 10A shows that LL2/1 edge coefficients stored in Row Buf 2 are used during the layer two vertical reconstruction transform, sometimes called the inverse transform, and that the LL2/1 edge coefficients from the last row of the current tile are copied into Row Buf 2 for use when the layer two vertical reconstruction transform is applied to the tile below the current tile. FIG. 10B shows that LL1/1 edge coefficients stored in Col Buf 2 are used during the layer two horizontal reconstruction transform, and that the LL1/1 edge coefficients from the last column of the current tile are copied into Col Buf 2 for use when the layer two horizontal reconstruction transform is applied to the tile to the right of the current tile.

Figure 10C:
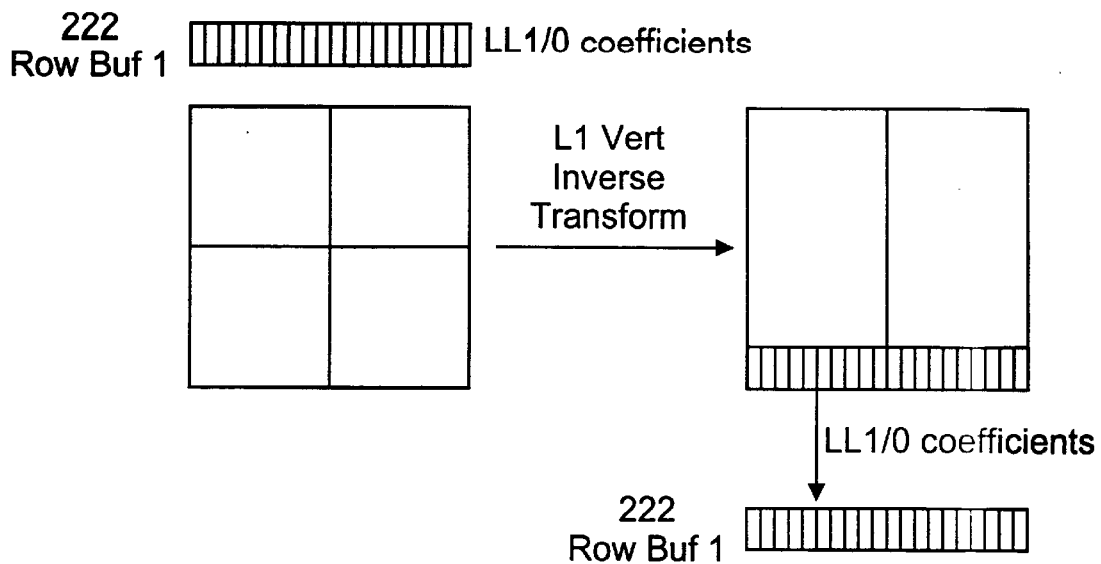
Figure 10D:
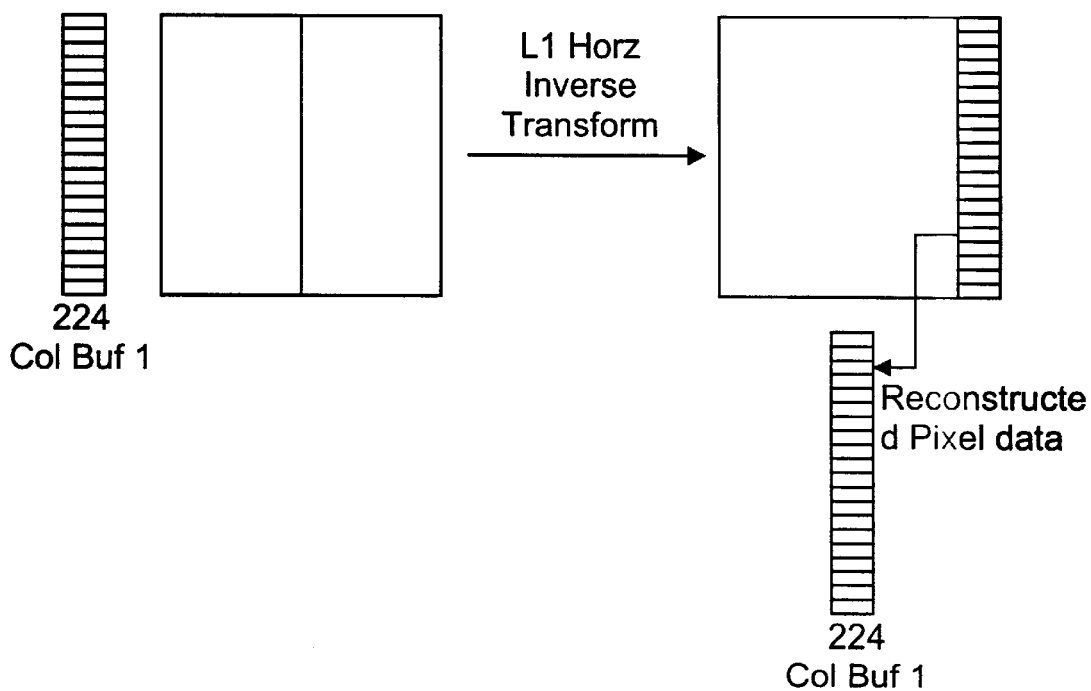

FIG. 10C shows that LL1/0 coefficients stored in Row Buf 1 are used during the layer one vertical reconstruction transform, and that the LL1/0 coefficients from the last row of the current tile are copied into Row Buf 1 for use when the layer one vertical reconstruction transform is applied to the tile below the current tile. FIG. 10D shows that reconstructed image data stored in Col Buf 1 is used during the layer one horizontal reconstruction transform, and that the reconstructed image data in the last column of the current tile is copied into Col Buf 1 for use when the layer one horizontal reconstruction transform is applied to the tile to the right of the current tile.

Thus, in general, the image reconstruction process for each tile, other than the first tile processed, uses sets of edge coefficients generated while processing one or two neighboring tiles. In particular, while reconstruction each such tile, each of a plurality of the inverse transform filters is applied to both the coefficients for the current tile and the edge coefficients from a previously processed neighboring tile.

Embodiment Using Non-Alternating Horizontal and Vertical Transforms

Figure 11:
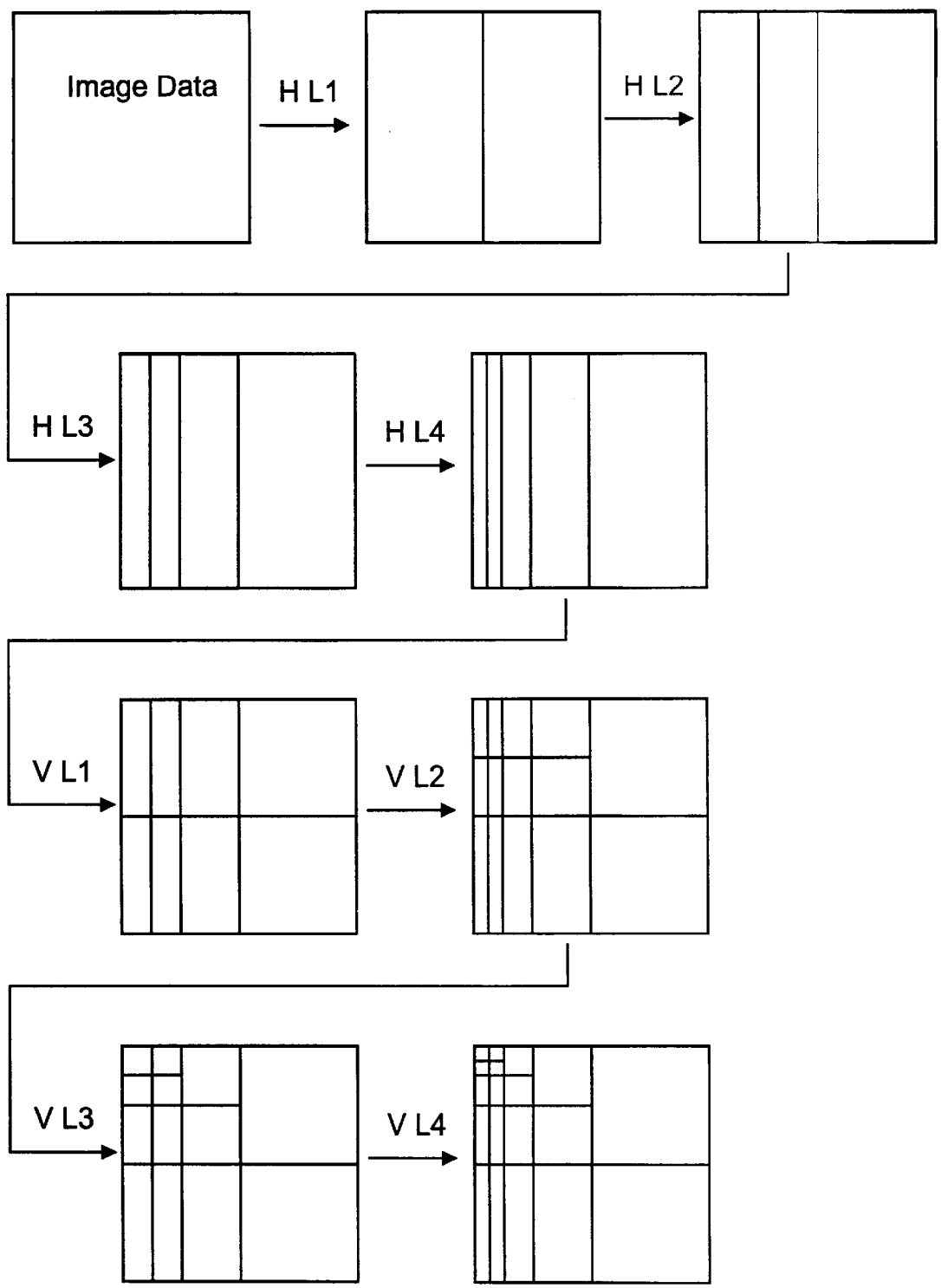
FIG. 11 depicts successive stages of an image processing process in which a set of several horizontal transforms are applied to an image data array, and then a set of several vertical transforms are applied to the coefficients generated by the horizontal transforms.

Referring to FIG. 11, in an other preferred embodiment, each tile of the image is first processed by N (e.g., four) horizontal decomposition transform layers and then by vertical decomposition transform layers. Equivalently, the vertical transform layers could be applied first and then the horizontal transform layers. In hardware implementations of the image transformation methodology of the present invention, this change in the order of the transform layers has the advantage of either (A) reducing the number of times the data array is rotated, or (B) avoiding the need for circuitry that switches the roles of rows and columns in the working image array(s). As shown in FIG. 11, the second horizontal transform (H L2) is applied to the leftmost array of low frequency coefficients generated by the first horizontal transform, and the third horizontal transform (H L3) is applied to the leftmost array of low frequency coefficients generated by the second horizontal transform, and so on. Thus, the second through Nth horizontal transforms are applied to twice as much data as in the transform method in which the horizontal and vertical transforms alternate. However, this extra data processing generally does not take any additional processing time in hardware implementations because in such implementations the horizontal filter is applied simultaneously to all rows of the working image array.

Still referring to FIG. 11, the N vertical transforms (V L1, V L2, V L3, V L4) are applied in succession to successively smaller subarrays of the working image array. After the image data has been transformed by the N transform layers (both horizontal and vertical) the quantization and encoding steps described above (with respect to FIG. 6) are applied to the resulting transform coefficients to complete the image encoding process.

As explained above, different (and typically shorter) transform filters may be applied to coefficients near the edges of the arrays being processed than the (typically longer) transform filter applied to coefficients away from those array edges. The use of longer transform filters in the middle provides better data compression than the shorter transform filters, while the shorter transform filters minimize the need for data and coefficients from neighboring tiles.

Figure 12:
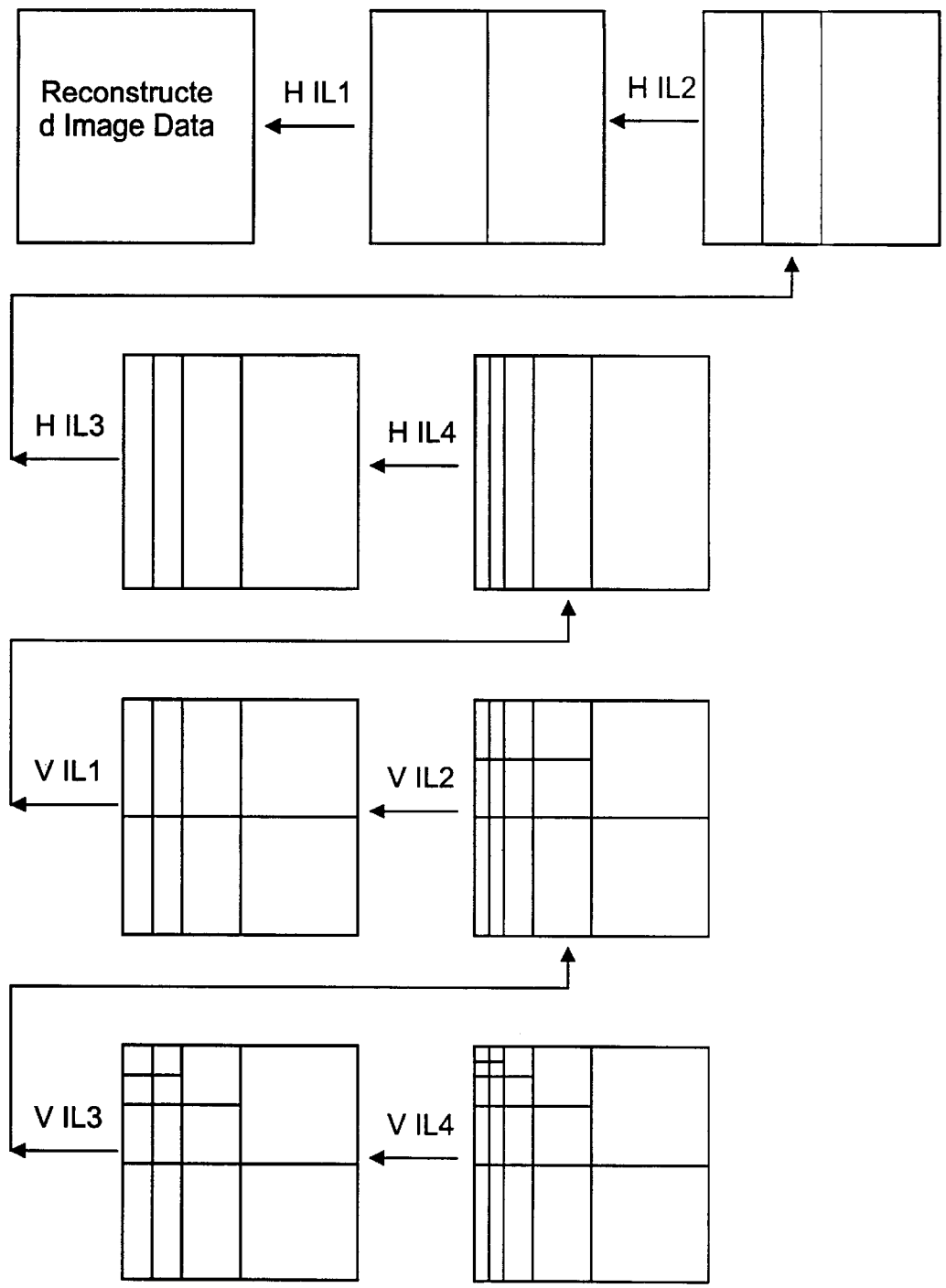
FIG. 12 depicts successive stages of applying inverse transforms to recover an image that has been processed by the process shown in FIG. 11.

Referring to FIG. 12, the image reconstruction process for reconstructing images compressed using the transform process shown in FIG. 11. Prior to performing the inverse transforms shown in FIG. 12, the compressed image data is decoded and de-quantized. The inverse transform steps of the image reconstruction process are then performed in exactly the reverse order of the transform steps of the image decomposition process. Thus, the process begins with four vertical inverse transforms (V IL4, V IL3, V IL2, V IL1) followed by four horizontal inverse transforms (H IL4, H IL3, H IL2 and H IL1). After all the inverse transforms have been performed, the resulting array represents one tile of the reconstructed image.

Alternate Embodiments

As indicated above, if speed of operation is not a concern, or if a very high speed programmable image data processor is used, the state machines of the embodiments described above can be replaced by software procedures that are executed by a data processor.

In an alternate embodiment, some or all of the transform filters could overlap the tile boundary by two or three rows or columns, instead of overlapping the tile boundary by just one row or column.

In streaming data implementations, such as in a web browser that receives compressed images encoded using the present invention, the tiles of the image may be decoded and decompressed on the fly, as other tiles of the image are being received. As a result, the compressed image may be reconstructed virtually immediately after the last of the image data is received over a communication channel.

Numerous other aspects of the described embodiments may change over time as technology improvements are used to upgrade various parts of the digital camera. For instance, the memory technology used to store image files might change from flash memory to another type of memory, or a camera might respond to voice commands, enabling the use of fewer buttons.

In another alternate embodiment, a different transform than the wavelet-like transform described above could be used.

In alternate embodiments the image tiles could be processed in a different order. For instance, the image tiles could be processed from right to left instead of left to right. In that case, the edge coefficients saved to array 226 would be left edge coefficients instead of right edge coefficients and the transform equations would be adjusted to use transform coefficients for the tile to the right of the current array instead of from the tile to left. Similarly, image tiles could be processed starting at the bottom row and proceeding toward the top row, in which case the edge coefficients saved to array 228 would be top edge coefficients instead of bottom edge coefficients and the transform equations would be adjusted to use transform coefficients for the tile below the current array instead of from the tile above.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of processing an array of image data, comprising:

processing tiles of the image data in a predefined order, the tiles comprising nonoverlapping portions of the image data, so as to generate processed image data; and storing the processed image data as a data image file;

the processing of each tile in a first subset of the tiles of image data comprising:

applying a predefined sequence of transform filters to the tile of image data so as to generate successive sets of transform coefficients; and saving a copy of predefined sets of edge transform coefficients from a corresponding plurality of the sets of transform coefficients for use while applying the predefined sequence of transform filters to predefined tiles neighboring the tile being processed;

the step of applying a predefined sequence of transform filters including, for a second subset of the first subset of tiles, applying each of a plurality of the transform filters to both the set of transform coefficients generated by a prior transform filter and the copy of a set of edge transform coefficients saved while processing a predefined neighboring tile.

2. The method of claim 1, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

3. The method of claim 1, wherein the tiles have boundaries, and a plurality of the transform filters are asymmetric, extending over each tile's boundary on a first side, but not extending over the tile's boundary on a second side opposite the first side.

4. The method of claim 1, wherein the transform filters are wavelet or wavelet-like decomposition transform filters.

5. The method of claim 1, wherein the step of applying a predefined sequence of transform filters comprises applying an alternating sequence of horizontal and vertical transform filters.

6. The method of claim 1, wherein the step of applying a predefined sequence of transform filters comprises applying an alternating sequence of vertical and horizontal transform filters.

7. The method of claim 1, wherein the step of applying a predefined sequence of transform filters comprises applying a predefined sequence of horizontal transform filters followed by applying a predefined sequence of vertical transform filters.

8. The method of claim 1, wherein the step of applying a predefined sequence of transform filters comprises applying a predefined sequence of vertical transform filters followed by applying a predefined sequence of horizontal transform filters.

9. A method of processing an array of image data, comprising:

processing tiles of the image data in a predefined order, the tiles comprising nonoverlapping portions of the image data, so as to generate processed image data;

while processing each of the tiles of image data, applying a predefined sequence of transform filters to the tile so as to generate successive sets of transform coefficients; and storing the processed image data as a data image file;

the processing of each tile in a first subset of the tiles including saving a copy of predefined sets of edge transform coefficients from a corresponding plurality of the sets of transform coefficients for use while applying the predefined sequence of transform filters to predefined tiles neighboring the tile being processed;

the step of applying a predefined sequence of transform filters including, for a second subset of the tiles, applying each of a plurality of the transform filters to both the set of transform coefficients generated by a prior transform filter and the copy of a set of edge transform coefficients saved while processing a predefined neighboring tile.

10. An image processing system, comprising:

image capture apparatus for generating an array of image data;

image processing circuitry to processing tiles of the image data in a predefined order, the tiles comprising non-overlapping portions of the image data, so as to generate processed image data; and memory for storing the processed image data as a data image file;

the image processing circuitry including:

logic for applying a predefined sequence of transform filters to each tile of image data so as to generate successive sets of transform coefficients; and logic, used in conjunction with processing a first subset of the tiles, for saving a copy of predefined sets of edge transform coefficients from a corresponding plurality of the sets of transform coefficients for use while applying the predefined sequence of transform filters to predefined tiles neighboring the tile being processed;

the logic for applying a predefined sequence of transform filters including logic, used in conjunction with processing a second subset of the tiles, for applying each of a plurality of the transform filters to both the set of transform coefficients generated by a prior transform filter and the copy of a set of edge transform coefficients saved while processing a predefined neighboring tile.

11. The image processing system of claim 10, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

12. The image processing system of claim 10, wherein the tiles have boundaries, and a plurality of the transform filters are asymmetric, extending over each tile's boundary on a first side, but not extending over the tile's boundary on a second side opposite the first side.

13. The image processing system of claim 10, wherein the transform filters are wavelet or wavelet-like decomposition transform filters.

14. The image processing system of claim 10, wherein the logic for applying a predefined sequence of transform filters applies an alternating sequence of horizontal and vertical transform filters to each tile.

15. The image processing system of claim 10, wherein the logic for applying a predefined sequence of transform filters applies an alternating sequence of vertical and horizontal transform filters to each tile.

16. The image processing system of claim 10, wherein the logic for applying a predefined sequence of transform filters applies a predefined sequence of horizontal transform filters to each tile and then applies a predefined sequence of vertical transform filters to each tile.

17. The image processing system of claim 10, wherein the logic for applying a predefined sequence of transform filters applies a predefined sequence of vertical transform filters to each tile and then applies a predefined sequence of horizontal transform filters to each tile.

18. A computer program product for use in conjunction with a computer system, the computer program product comprising a computer readable storage medium and a computer program mechanism embedded therein, the computer program mechanism comprising: n image processing system, comprising:

an image processing module for receiving an array of image data and for processing tiles of the image data in a predefined order, the tiles comprising nonoverlapping portions of the image data, so as to generate processed image data, the image processing module storing the processed image data as a data image file;

the image processing module including a tile decomposition submodule for applying a predefined sequence of transform filters to each tile of image data so as to generate successive sets of transform coefficients;

the tile decomposition submodule including edge coefficient saving instructions, used in conjunction with processing a first subset of the tiles of image data, for saving a copy of predefined sets of edge transform coefficients from a corresponding plurality of the sets of transform coefficients for use while applying the predefined sequence of transform filters to predefined tiles neighboring the tile being processed;

the tile decomposition submodule including edge coefficient consuming decomposition instructions, used in conjunction with processing a second subset of the tiles of image data, for applying each of a plurality of the transform filters to both the set of transform coefficients generated by a prior transform filter and the copy of a set of edge transform coefficients saved while processing a predefined neighboring tile.

19. The computer program product of claim 18, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

20. The computer program product of claim 18, wherein the tiles have boundaries, and a plurality of the transform filters are asymmetric, extending over each tile's boundary on a first side, but not extending over the tile's boundary on a second side opposite the first side.

21. The computer program product of claim 18, wherein the transform filters are wavelet or wavelet-like decomposition transform filters.

22. The computer program product of claim 18, wherein the tile decomposition submodule applies an alternating sequence of horizontal and vertical transform filters to each tile of image data.

23. The computer program product of claim 18, wherein the tile decomposition submodule applies an alternating sequence of vertical and horizontal transform filters to each tile of image data.

24. The computer program product of claim 18, wherein the tile decomposition submodule applies a predefined sequence of horizontal transform filters to each tile of image data and then applies a predefined sequence of vertical transform filters to each tile of image data.

25. The computer program product of claim 18, wherein the tile decomposition submodule applies a predefined sequence of vertical transform filters to each tile of image data and then applies a predefined sequence of horizontal transform filters to each tile of image data.

26. A method of reconstructing an array of image data from an array of compressed image data, comprising:
  processing tiles of the compressed image data in a predefined order, the tiles comprising nonoverlapping portions of the compressed image data, so as to generate reconstructed image data representing a reconstructed image;
  while processing each of the tiles of compressed image data, applying a predefined sequence of inverse transform filters to the tile so as to generate successive sets of transform coefficients and then a set of reconstructed image data; and
  storing or displaying the reconstructed image data;
  the processing of each tile in a first subset of the tiles including saving a copy of predefined sets of edge transform coefficients from a corresponding plurality of the sets of transform coefficients for use while applying the predefined sequence of inverse transform filters to predefined tiles neighboring the tile being processed;
  the step of applying a predefined sequence of inverse transform filters including, for a second subset of the tiles, applying each of a plurality of the inverse transform filters to both the set of transform coefficients generated by a prior inverse transform filter and the copy of a set of edge transform coefficients saved while processing a predefined neighboring tile.

27. The method of claim 26, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

28. The method of claim 26, wherein the tiles have boundaries, and a plurality of the transform filters are asymmetric, extending over each tile's boundary on a first side, but not extending over the tile's boundary on a second side opposite the first side.

29. The method of claim 26, wherein the inverse transform filters are wavelet or wavelet-like reconstruction transform filters.

30. The method of claim 26, wherein the step of applying a predefined sequence of inverse transform filters comprises applying an alternating sequence of horizontal and vertical inverse transform filters.

31. The method of claim 26, wherein the step of applying a predefined sequence of inverse transform filters comprises applying an alternating sequence of vertical and horizontal inverse transform filters.

32. The method of claim 26, wherein the step of applying a predefined sequence of inverse transform filters comprises applying a predefined sequence of horizontal inverse transform filters followed by applying a predefined sequence of vertical inverse transform filters.

33. The method of claim 26, wherein the step of applying a predefined sequence of inverse transform filters comprises applying a predefined sequence of vertical inverse transform filters followed by applying a predefined sequence of horizontal inverse transform filters.

34. An image processing system, comprising:
  memory for storing an array of compressed image data; and
  image reconstruction circuitry for processing tiles of the compressed image data in a predefined order, the tiles comprising nonoverlapping portions of the compressed image data, so as to generate reconstructed image data representing a reconstructed image;
  the image reconstruction circuitry including:
    logic for applying a predefined sequence of inverse transform filters to each tile of compressed image data so as to generate successive sets of transform coefficients and then a set of reconstructed image data; and
    logic, used in conjunction with processing a first subset of the tiles, for saving a copy of predefined sets of edge transform coefficients from a corresponding plurality of the sets of transform coefficients for use while applying the predefined sequence of inverse transform filters to predefined tiles neighboring the tile being processed;
    the logic for applying a predefined sequence of inverse transform filters including logic, used in conjunction with processing a second subset of the tiles, for applying each of a plurality of the inverse transform filters to both the set of transform coefficients generated by a prior transform filter and the copy of a set of edge transform coefficients saved while processing a predefined neighboring tile.

35. The image processing system of claim 34, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

36. The image processing system of claim 34, wherein the tiles have boundaries, and a plurality of the transform filters are asymmetric, extending over each tile's boundary on a first side, but not extending over the tile's boundary on a second side opposite the first side.

37. The image processing system of claim 34, wherein the inverse transform filters are wavelet or wavelet-like reconstruction transform filters.

38. The image processing system of claim 34, wherein the logic for applying a predefined sequence of inverse transform filters applies an alternating sequence of horizontal and vertical inverse transform filters to each tile.

39. The image processing system of claim 34, wherein the logic for applying a predefined sequence of inverse transform filters applies an alternating sequence of vertical and horizontal inverse transform filters to each tile.

40. The image processing system of claim 34, wherein the logic for applying a predefined sequence of inverse transform filters applies a predefined sequence of horizontal inverse transform filters to each tile and then applies a predefined sequence of vertical inverse transform filters to each tile.

41. The image processing system of claim 34, wherein the logic for applying a predefined sequence of inverse transform filters applies a predefined sequence of vertical transform filters to each tile and then applies a predefined sequence of horizontal transform filters to each tile.

42. A computer program product for use in conjunction with a computer system, the computer program product comprising a computer readable storage medium and a computer program mechanism embedded therein, the computer program mechanism comprising: n image processing system, comprising:

an image processing module for receiving an array of compressed image data and for processing tiles of the compressed image data in a predefined order, the tiles comprising nonoverlapping portions of the compressed image data, so as to generate reconstructed image data representing a reconstructed image;

the image processing module including a tile reconstruction submodule for applying a predefined sequence of inverse transform filters to each tile of image data so as to generate successive sets of transform coefficients and then a set of reconstructed image data;

the tile reconstruction submodule including edge coefficient saving instructions, used in conjunction with processing a first subset of the tiles, for saving a copy of predefined sets of edge transform coefficients from a corresponding plurality of the sets of transform coefficients for use while applying the predefined sequence of inverse transform filters to predefined tiles neighboring the tile being processed;

the tile reconstruction submodule including edge coefficient consuming reconstruction instructions, used in conjunction with processing a second subset of the tiles, for applying each of a plurality of the inverse transform filters to both the set of transform coefficients generated by a prior transform filter and the copy of a set of edge transform coefficients saved while processing a predefined neighboring tile.

43. The computer program product of claim 42, wherein a first subset of the predefined sets of edge transform coefficients each include a row of transform coefficients along a top or bottom edge of the corresponding set of transform coefficients, and a second subset of the predefined sets of edge transform coefficients each include a column of transform coefficients along a left or right edge of the corresponding set of transform coefficients.

44. The computer program product of claim 42, wherein the tiles have boundaries, and a plurality of the transform filters are asymmetric, extending over each tile's boundary on a first side, but not extending over the tile's boundary on a second side opposite the first side.

45. The computer program product of claim 42, wherein the inverse transform filters are wavelet or wavelet-like reconstruction transform filters.

46. The computer program product of claim 42, wherein the tile reconstruction submodule applies an alternating sequence of horizontal and vertical inverse transform filters to each tile.

47. The computer program product of claim 42, wherein the tile reconstruction submodule applies an alternating sequence of vertical and horizontal inverse transform filters to each tile.

48. The computer program product of claim 42, wherein the tile reconstruction submodule applies a predefined sequence of horizontal inverse transform filters to each tile and then applies a predefined sequence of vertical inverse transform filters to each tile.

49. The computer program product of claim 42, wherein the tile reconstruction submodule applies a predefined sequence of vertical inverse transform filters to each tile and then applies a predefined sequence of horizontal inverse transform filters to each tile.

* * * * *